United States Patent
Miki

(10) Patent No.: US 9,321,505 B2
(45) Date of Patent: Apr. 26, 2016

(54) BICYCLE HYDRAULIC COMPONENT OPERATING DEVICE

(75) Inventor: Yoshimitsu Miki, Sakai (JP)

(73) Assignee: Shimano Inc., Osaka (JP)

( * ) Notice: Subject to any disclaimer, the term of this patent is extended or adjusted under 35 U.S.C. 154(b) by 791 days.

(21) Appl. No.: 13/435,202

(22) Filed: Mar. 30, 2012

(65) Prior Publication Data

US 2013/0255239 A1    Oct. 3, 2013

(51) Int. Cl.
| B60T 13/00 | (2006.01) |
| B62L 3/02 | (2006.01) |
| B60T 11/22 | (2006.01) |
| B62K 23/06 | (2006.01) |
| B62M 25/08 | (2006.01) |

(52) U.S. Cl.
CPC ............. B62L 3/023 (2013.01); B60T 11/22 (2013.01); B62K 23/06 (2013.01); B62M 25/08 (2013.01)

(58) Field of Classification Search
CPC ............ B62L 3/02; B62L 3/023; B60T 11/22
USPC ................... 60/547.1, 594; 188/344, 151 R
See application file for complete search history.

(56) References Cited

U.S. PATENT DOCUMENTS

| 3,993,174 A | 11/1976 | Williams et al. |
| 4,175,648 A | 11/1979 | Sule |
| 4,391,353 A | 7/1983 | Mathauser |
| 4,615,415 A | 10/1986 | Mathauser |
| 4,921,081 A | 5/1990 | Chilcote |
| 8,485,060 B2* | 7/2013 | Emura ................. B62M 25/04 74/473.13 |
| 2003/0121736 A1* | 7/2003 | Lumpkin .................. 188/151 R |
| 2007/0131495 A1 | 6/2007 | Matsushita et al. |
| 2007/0131503 A1 | 6/2007 | Matsushita et al. |
| 2007/0284203 A1* | 12/2007 | Tetsuka et al. ................ 188/344 |
| 2009/0031841 A1 | 2/2009 | Tetsuka |
| 2010/0064838 A1 | 3/2010 | Siew et al. |
| 2010/0186538 A1 | 7/2010 | Tetsuka |
| 2011/0147149 A1 | 6/2011 | Tetsuka et al. |
| 2012/0160625 A1* | 6/2012 | Jordan ......................... 188/344 |
| 2012/0240715 A1* | 9/2012 | Tsai ............................... 74/504 |

FOREIGN PATENT DOCUMENTS

| TW | 200827236 A | 7/2008 |
| TW | M342334 U | 10/2008 |
| TW | 200925031 A | 6/2009 |

(Continued)

Primary Examiner — F. Daniel Lopez
Assistant Examiner — Daniel Collins
(74) Attorney, Agent, or Firm — Global IP Counselors

(57) ABSTRACT

A bicycle hydraulic component operating device is provided with a main body, a hydraulic cylinder housing, a piston, an operating lever, and a fluid reservoir tank. The main body includes a handlebar mounting portion and a gripping portion. The hydraulic cylinder housing is supported by the main body. The piston is movably disposed within the hydraulic cylinder housing. The operating lever is pivotally disposed around a pivot axis relative to the main body to move the piston within the hydraulic cylinder housing in response to pivotal movement of the operating lever relative to the main body. The fluid reservoir tank is in fluid communication with the hydraulic cylinder housing. The fluid reservoir tank is supported by one of the main body and the operating lever at a location spaced from an area directly above the hydraulic cylinder housing while the bicycle hydraulic component operating device is in an installed position.

10 Claims, 20 Drawing Sheets

(56) References Cited

FOREIGN PATENT DOCUMENTS

| TW | M359489 | U | 6/2009 |
| TW | I321109 | B | 3/2010 |
| TW | I346068 | B | 3/2010 |
| TW | M412125 | U | 9/2011 |
| TW | M412125 | U1 | 9/2011 |

\* cited by examiner

BICYCLE HYDRAULIC COMPONENT OPERATING DEVICE

BACKGROUND

1. Field of the Invention

This invention generally relates to a component operating device for operating a hydraulic component. More specifically, the present invention relates to a bicycle hydraulic component operating device having a fluid reservoir tank in fluid communication with a hydraulic cylinder bore to form an open system type.

2. Background Information

In recent years, some high performance bicycles have been provided with hydraulic disc brake systems or other brake types of hydraulic brake system such as hydraulic shoe brakes. In the case of bicycles, the hydraulic brake systems are typically actuated by a brake lever that is attached to a bicycle handlebar. The brake lever is typically part of a brake operating device that attaches the brake lever to the bicycle handlebar. The brake operating device typically includes a master piston that is slidably disposed in a cylinder bore of a master cylinder, and which is actuated by the brake lever. The master cylinder contains a hydraulic fluid. The cylinder bore of the master cylinder is in fluid communication with a disc brake caliper housing in the case of a hydraulic disc brake via a fluid conduit. Brake pads of the disc brake caliper housing are typically spaced apart from a rotor by a predetermined gap. As the brake lever is operated contracted towards the handlebar), the master piston moves in the cylinder bore of the master cylinder to force liquid out of the master cylinder and into the fluid conduit connected to the caliper housing. The movement of fluid into the caliper housing causes the pistons in the caliper housing to move, and eventually brings the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

SUMMARY

Generally, the present disclosure is directed to various features of the bicycle hydraulic component operating device. In one feature, a bicycle hydraulic component operating device is provided that basically comprises a main body, a hydraulic cylinder housing, a piston, an operating lever, and a fluid reservoir tank. The main body includes a handlebar mounting portion and a gripping portion. The hydraulic cylinder housing is supported by the main body. The piston is movably disposed within the hydraulic cylinder housing. The operating lever is pivotally disposed around a pivot axis relative to the main body to move the piston within the hydraulic cylinder housing in response to pivotal movement of the operating lever relative to the main body. The fluid reservoir tank is in fluid communication with the hydraulic cylinder housing. The fluid reservoir tank is supported by one of the main body and the operating lever at a location spaced from an area directly above the hydraulic cylinder housing while the bicycle hydraulic component operating device is in an installed position.

In another feature, a bicycle hydraulic component operating device is provided that basically comprises a main body, a hydraulic unit, an operating lever and a fluid reservoir tank. The main body includes a handlebar mounting portion and a gripping portion having a pair of lateral sidewalls with a receiving cavity formed between the sidewalk and an insertion opening located between the lateral sidewalk. The hydraulic unit is disposed within the receiving cavity and dimensioned relative to the insertion opening to be inserted into the receiving cavity via the insertion opening. The hydraulic unit includes a hydraulic cylinder housing supported by the main body and a piston movably disposed within the hydraulic cylinder housing. The operating lever is pivotally disposed around a pivot axis relative to the main body to move the piston within the hydraulic cylinder housing in response to pivotal movement of the operating lever relative to the main body. The fluid reservoir tank in fluid communication with the hydraulic cylinder housing, the fluid reservoir tank being supported by one of the main body and the operating lever.

These features and other features, objects, aspects and advantages of the present invention will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. it will be apparent to those skilled in the bicycle field from this disclosure that the following descriptions of the embodiments are provided for illustration only and not fir the purpose of limiting the invention as defined by the appended claims and their equivalents.

Figure 1:
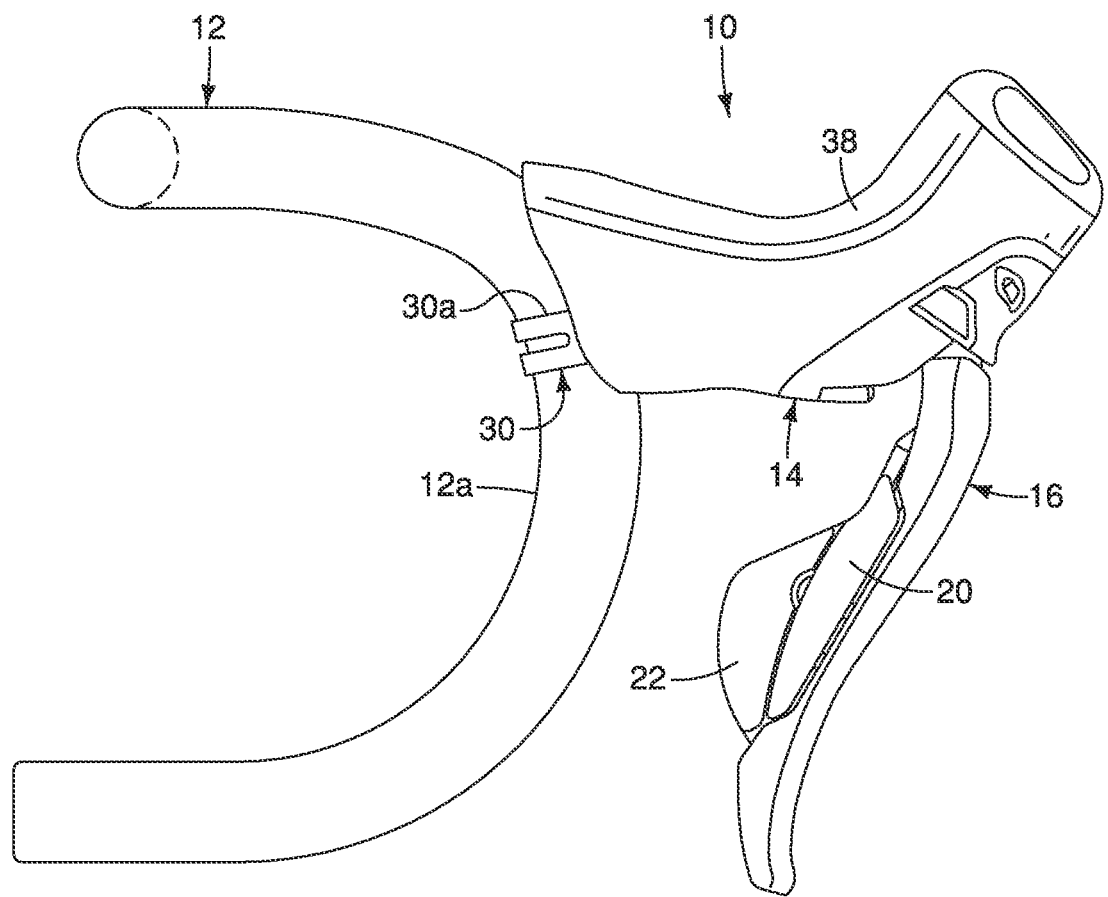
FIG. 1 is an outside elevational view of a dropdown bicycle handlebar that is equipped with a bicycle hydraulic brake operating device in accordance with a first embodiment.

Referring initially to FIG. 1, a bicycle hydraulic component operating device 10 is illustrated in accordance with a first embodiment. The bicycle hydraulic component operating device 10 is mounted to a dropdown bicycle handlebar 12. In particular, the bicycle hydraulic component operating device 10 is mounted to a curved section 12a of the dropdown bicycle handlebar 12. In other words, the bicycle hydraulic component operating device 10 is particularly designed for a bicycle that is equipped with the dropdown bicycle handlebar 12. As explained below, the bicycle hydraulic component operating device 10 includes both a braking function and a shifting function in a single unit. However, it will be apparent to those skilled in the bicycle field from this disclosure that the shifting function could be eliminated from the bicycle hydraulic component operating device 10 if needed and/or desired. The bicycle hydraulic component operating device 10 is a bicycle hydraulic brake operating device that is specifically designed to be mounted to the curved section 12a of the dropdown bicycle handlebar 12.

In the first embodiment, the bicycle hydraulic component operating device 10 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 12a of the dropdown bicycle handlebar 12, as illustrated in FIG. 1, and that includes both braking and shifting functions in a single unit.

In FIGS. 1 to 8, the bicycle hydraulic component operating device 10 (hereinafter "bicycle hydraulic brake operating device 10") is a right hand side control device operated by the rider's right hand to operate a first brake device (not shown) and a first gear shifting device (not shown, e.g., an electric rear derailleur). It will be apparent to those skilled in the bicycle field that the configuration of the bicycle shift operating device 10 can be adapted to a left hand side control device that is operated by the rider's left hand.

Figure 2:
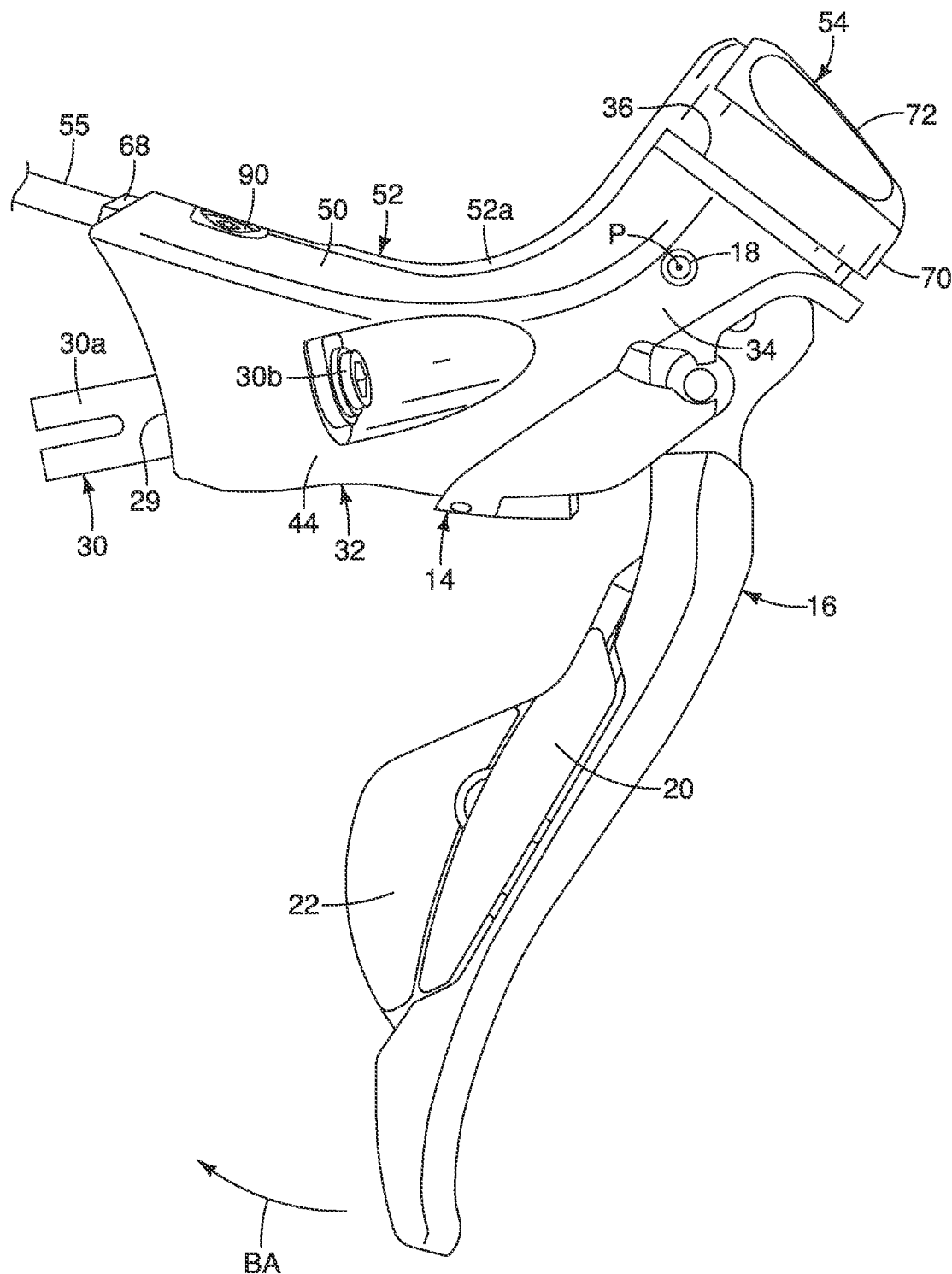
FIG. 2 is an outside elevational view of the bicycle hydraulic brake operating device illustrated in FIG. 1 with the grip cover removed.

As illustrated in FIG. 2, the bicycle hydraulic brake operating device 10 basically includes a main body 14 and an operating lever 16 (hereinafter "brake lever 16"). The brake lever 16 is pivotally mounted to the main body 14 by a pivot pin 18 that defines a pivot axis P. As explained below, the brake lever 16 is biased to a rest position. Thus, the brake lever 16 moves from the rest position along a brake operating path BA (FIG. 2) to a braking position for performing a braking operation.

In the first embodiment, the brake lever 16 is provided with a pair of gearshift operating parts 20 and 22 for performing gearshifting operations of a gear changing device (not shown). The gearshift operating parts 20 and 22 are electrically connected to a gearshift control unit 24 (see FIG. 3) that is mounted within a recess in the main body 14. The gearshift operating parts 20 and 22 are constructed as shown in U.S. Patent Application Publication No. 2009/0031841 A1 (assigned to Shimano, Inc.). It will be apparent to those skilled in the bicycle field that the gearshift operating parts 20 and 22 that are not limited to the illustrated structure and arrangement, but rather other suitable structures and arrangements can be used as needed and/or desired. The gearshift control unit 24 is a microcomputer that is located in the main body 14. However, the gearshift control unit 24 can be remotely located if needed and/or desired. Since various electrical shifting systems such as the one illustrated herein are known in the bicycle field, the gearshift operating parts 20 and 22 and the gearshift control unit 24 will not be discussed herein for the sake of brevity.

As illustrated in FIG. 2, the main body 14 includes a handlebar mounting portion 29 provided with a mounting member 30, a gripping portion 32, a lever mounting portion 34 and a pommel portion 36. The main body 14 defines a drop down handlebar bracket which is made of a rigid, hard material. The lever mounting portion 34 and the pommel portion 36 are located at a forward free end of the drop down handlebar bracket. The gripping portion 32 is located at a rearward mounting end of the drop down handlebar bracket.

As illustrated in FIG. 1, a grip cover 38 is stretched over at least the gripping portion 32 and a pommel portion 36 to provide a cushion to the gripping portion 32 of the main body 14 and to provide an attractive appearance. Typically, the grip cover 38 is made of elastic material such as rubber.

The mounting member 30 is a conventional handlebar clamp that is attached to the main body 14 for releasably securing the main body 14 to the curved section 12a of the dropdown bicycle handlebar 12. The mounting member 30 basically includes a clamping band 30a and a bolt 30b that screws into a nut part of the clamping band 30a. By tightening the bolt 30b, the clamping ring 30a is moved toward the handlebar mounting portion 29 such that the curved section 12a of the dropdown bicycle handlebar 12 is squeezed between the clamping band 30a and the handlebar mounting portion 29. It will be apparent to those skilled in the bicycle field that the mounting member 30 that is not limited to the illustrated clamp, but rather other suitable attachment mechanisms can be used as needed and/or desired.

The handlebar mounting portion 29 contacts the curved section 12a of the dropdown bicycle handlebar 12 when the bolt 30b is tightened to move the clamping band 30a towards the handlebar mounting portion 29. The main body 14 also has a pair of lateral sidewalk 42 and 44 with a receiving cavity 46 formed between the lateral sidewalk 42 and 44. The main body 14 also has an insertion opening 48 formed in a top surface 50 of the main body 14. Thus, the top surface 50 of the main body 14 defines the insertion opening 48 of the receiving cavity 46. In this way, the insertion opening 48 is located between the lateral sidewalk 42 and 44 as seen from the top plan view of FIG. 3.

Figure 6:
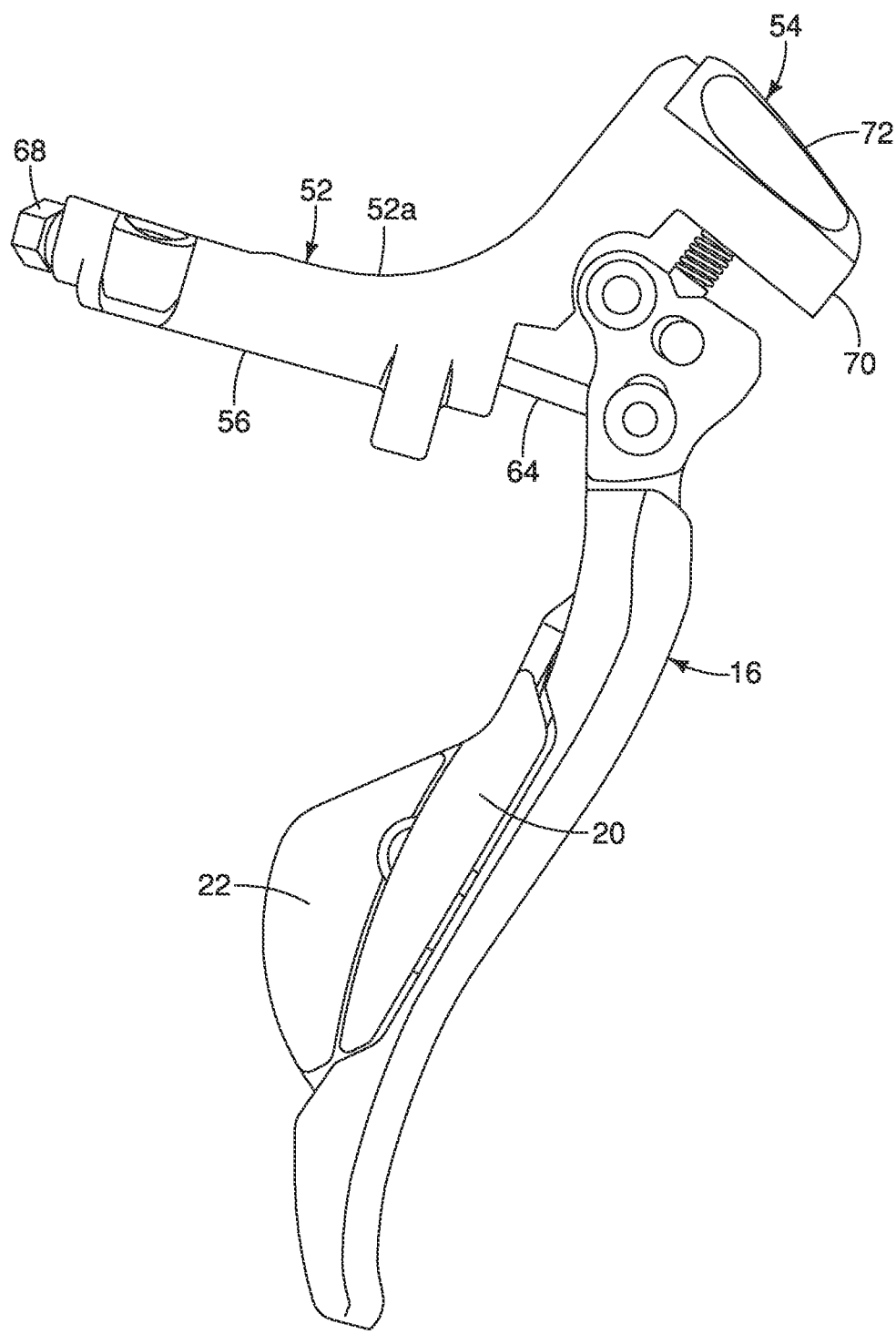
FIG. 6 is an outside elevational view of the hydraulic unit with the brake lever operatively attached to the master piston via the connecting rod.
Figure 7:
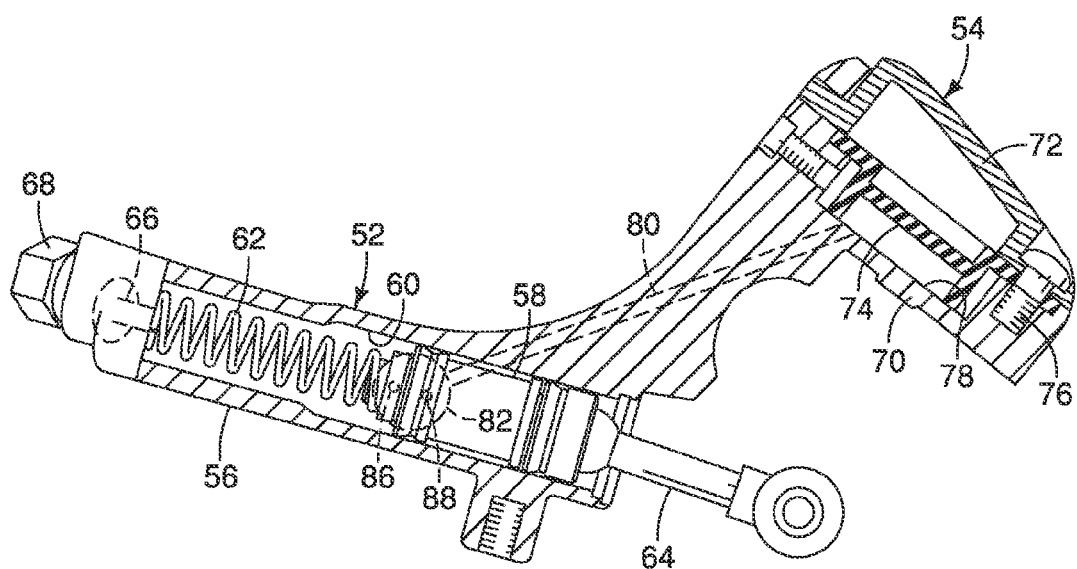
FIG. 7 is a center longitudinal cross sectional view of the hydraulic unit of the bicycle hydraulic brake operating device illustrated in FIGS. 1 to 3 as seen along section line A1-A1 of FIG. 4.
Figure 8:
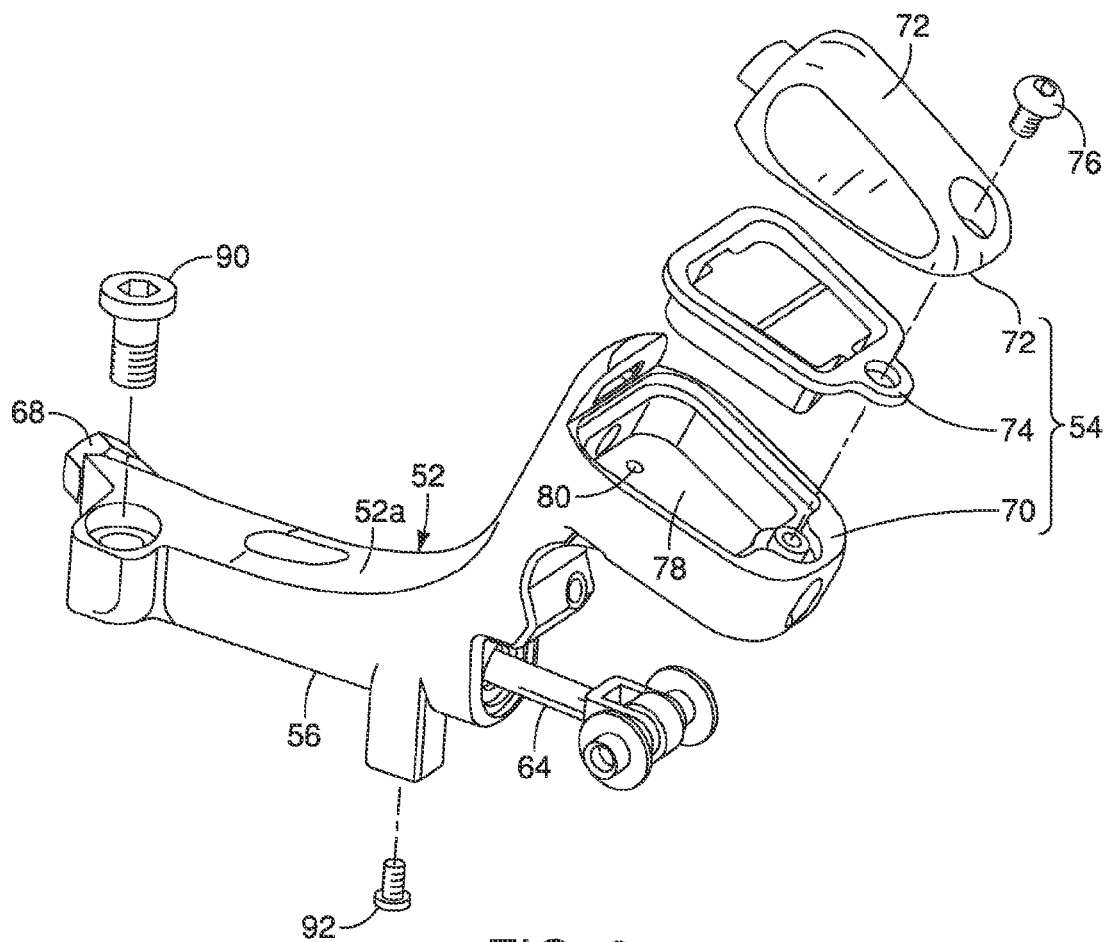
FIG. 8 is a partially exploded perspective view of the hydraulic unit of the bicycle hydraulic brake operating device illustrated in FIGS. 1 to 3.
Figure 9:
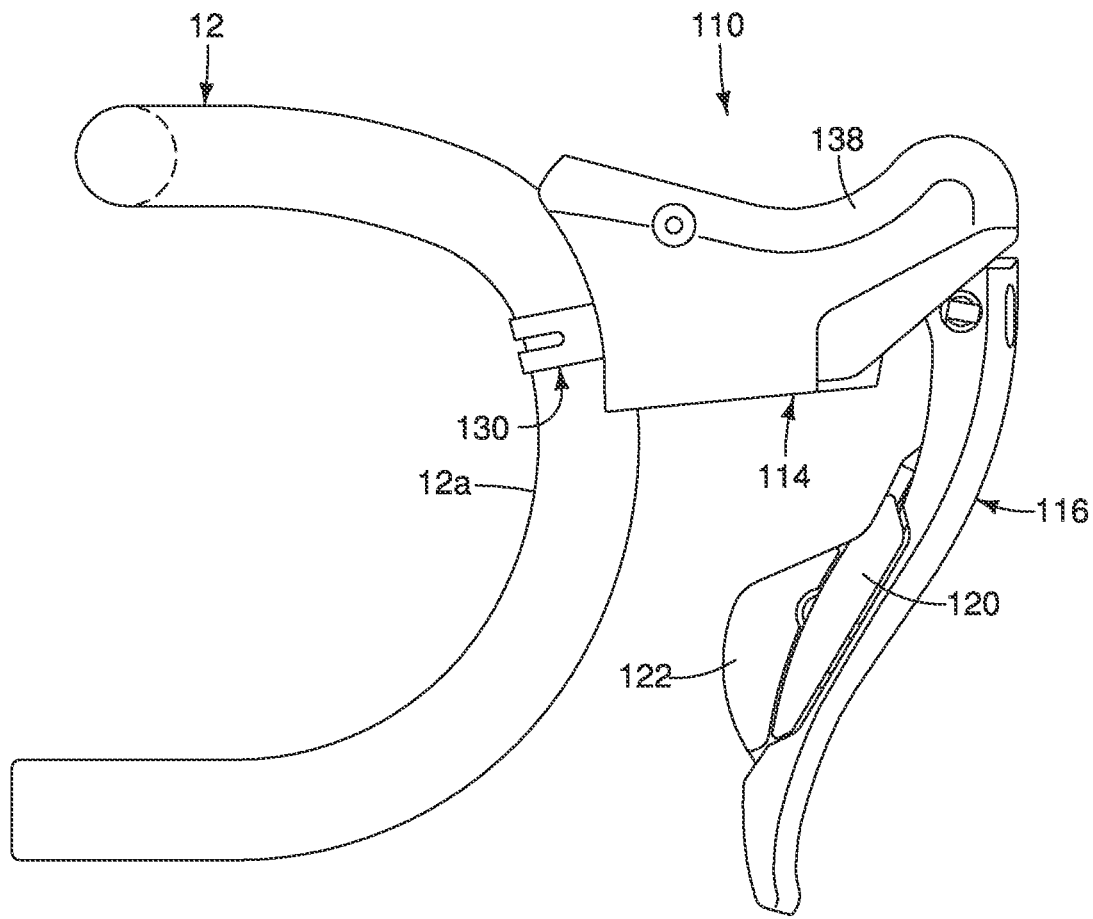
FIG. 9 is an outside elevational view of a dropdown bicycle handlebar that is equipped with a bicycle hydraulic brake operating device in accordance with a second embodiment.

Referring mainly to FIGS. 6 to 8, the bicycle hydraulic brake operating device 10 further includes a hydraulic unit 52 and a fluid reservoir tank 54. As explained below, the hydraulic unit 52 is in fluid communication with the fluid reservoir tank 54 such that the reservoir tank 54 supplies hydraulic fluid that is contained in the reservoir tank 54 to the hydraulic unit 52. Also the hydraulic unit 52 is in fluid communication with a hydraulic disc brake system (not shown) by a hydraulic hose or tube 55 (See FIG. 2). Basically, operation of the brake lever 16 causes hydraulic fluid to move from the hydraulic unit 52 to a slave piston or pistons in a hydraulic brake caliper such that brake pads come into contact with a rotor for applying frictional resistance and causing the bicycle to slow down or stop. Of course, the bicycle hydraulic brake operating device 10 is not limited to being used with a hydraulic disc brake system. Rather, the bicycle hydraulic brake operating device 10 can be used with other brake system such as hydraulic shoe brakes.

As illustrated in FIG. 7, the hydraulic unit 52 basically includes a hydraulic cylinder housing 56 and a piston 58. The hydraulic cylinder housing 56 is often called a master cylinder and the piston 58 is often called a master piston. The hydraulic cylinder housing 56 is supported by the main body 14. In particular, the hydraulic cylinder housing 56 is disposed within the gripping portion 32 of the main body 14. The piston 58 is movably disposed within a cylinder bore 60 of the hydraulic cylinder housing 56 in a reciprocal manner in response to operation of the brake lever 16. The piston 58 and the internal surface of the cylinder bore 60 defines a hydraulic chamber of the hydraulic unit 52. A biasing element 62 is disposed in the cylinder bore 60 for biasing the piston 58 to a rest position. In the first illustrated embodiment, the biasing element 62 is a coil compression spring (return spring) that also biases the brake lever 16 to its rest position as seen in FIG. 6. As illustrated in FIG. 6, the brake lever 16 is operatively connected to the piston 58 by a connecting rod 64.

In the first illustrated embodiment, the connecting rod 64 is connected to the brake lever 16 with a reach adjustment connection (not illustrated) that adjusts the reach of the brake lever 16. The illustrated reach adjustment connection between the connecting rod 64 and the brake lever 16 substantially similar in construction to the reach adjustment connection that is disclosed in U.S. Patent Application Publication No. 2011/0147149 A1 (assigned to Shimano, Inc.). Also as illustrated in FIG. 6, the main body 14 includes a piston end position adjustment connection that controls relative positions of the brake lever 16 and the piston 58 in their rest positions with respect to the hydraulic cylinder housing 56.

Figure 3:
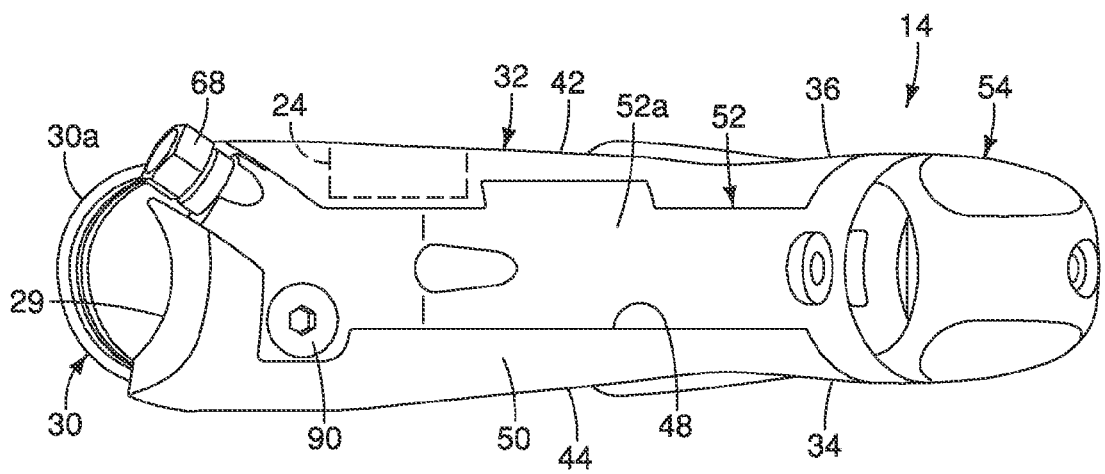
FIG. 3 is a top plan view of the bicycle hydraulic brake operating device illustrated in FIGS. 1 and 2 with the grip cover removed.
Figure 4:
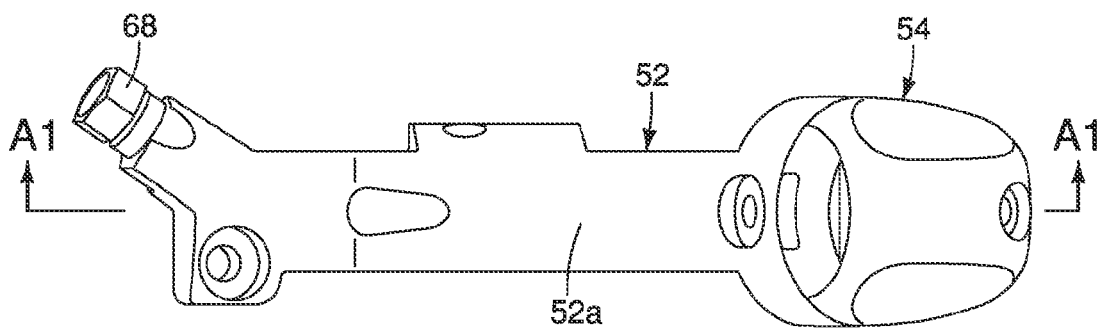
FIG. 4 is a top plan view of the hydraulic unit of the bicycle hydraulic brake operating device illustrated in FIGS. 1 to 3.
Figure 5:
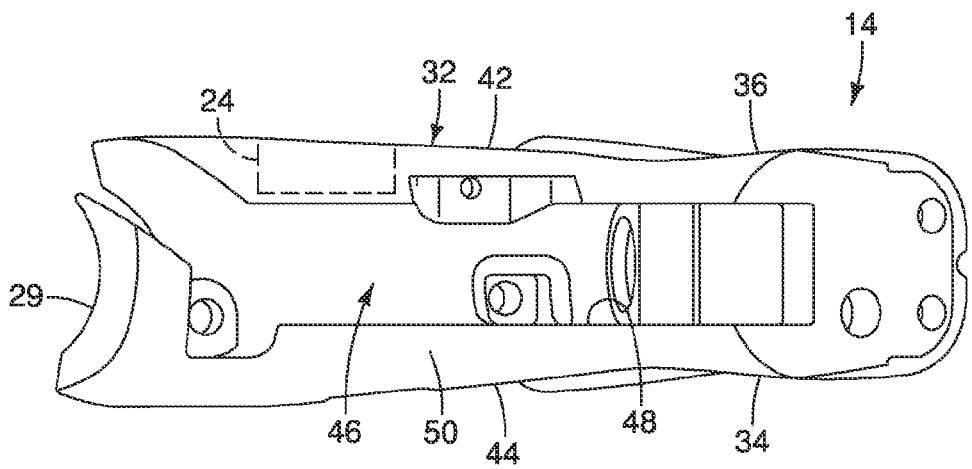
FIG. 5 is a top plan view of the main body (i.e., the drop down handlebar bracket) of the bicycle hydraulic brake operating device illustrated in FIGS. 1 to 3 with the hydraulic unit removed.

As illustrated in FIG. 3, the hydraulic unit 52 is disposed within the receiving cavity 46 of the main body 14. Thus, the hydraulic unit 52 is dimensioned relative to the insertion opening 48 to be inserted into the receiving cavity 46 via the insertion opening 48. In this way, a top surface 52a of the hydraulic cylinder housing 56 of the hydraulic unit 52 forms a seat of the gripping portion 32 for the rider's hand. In other words, the top surface 52a of the hydraulic cylinder housing 56 closes the insertion opening 48 and smoothly mates with the top surface 50 of the main body 14. As illustrated in FIG. 3, the insertion opening 48 is located between the lateral sidewalk 42 and 44 at the top surface 50 of the main body 14. Alternatively, the insertion opening can be relocated between the lateral sidewalk 42 and 44 at a bottom surface of the main body 14 such that the hydraulic unit 52 is inserted into the main body 14 from below.

The fluid reservoir tank 54 is supported by the main body 14. In this first embodiment, the fluid reservoir tank 54 is disposed at an upper side of the main body 14 relative to the pivot axis P of the brake lever 16 while the bicycle hydraulic brake operating device 10 is in the installed position. Also in this first embodiment, the fluid reservoir tank 54 is at least partially disposed on the main body 14 at a location primarily forward of the pivot axis P of the brake lever 16 while the bicycle hydraulic brake operating device 10 is in the installed position. In particular, the fluid reservoir tank 54 is disposed above the hydraulic cylinder housing 56 at a location on the pommel portion 36 of the main body 14. Of course, it will be apparent to those skilled in the bicycle field from this disclosure that the fluid reservoir tank 54 is not limited to the illustrated location, but rather other suitable locations as disclosed in the later embodiments can also be used. In any case, the location of the fluid reservoir tank 54 is preferably supported by one of the main body 14 and the brake lever 16 at a location spaced from an area directly above the hydraulic cylinder housing 56 while the bicycle hydraulic brake operating device 10 is in an installed position.

The hydraulic cylinder housing 56 has an outlet port 66 that extends from the cylinder bore 60 to the outside of the hydraulic cylinder housing 56. The outlet port 66 is partially threaded to receive a hydraulic hose connector 68 for attaching the hydraulic hose 55. Thus, as the brake lever 16 is pivoted around the pivot axis P relative to the main body 14, the piston 58 moves within the cylinder bore 60 of the hydraulic cylinder housing 56 against the force of the biasing element 62 to force hydraulic fluid out of the cylinder bore 60 through the outlet port 66.

As illustrated in FIGS. 7 and 8, the fluid reservoir tank 54 includes a reservoir 70, a cover 72 and a flexible diaphragm 74. The flexible diaphragm 74 is disposed between the reservoir 70 and the cover 72. The cover 72 and the flexible diaphragm 74 are attached to the reservoir 70 by a screw 76 such that the cover 72 covers a hydraulic fluid chamber 78 defined by the reservoir 70. The flexible diaphragm 74 includes a protruding part that is extends into the hydraulic fluid cavity 78. In the first illustrated embodiment, the hydraulic cylinder housing 56 and the reservoir 70, which defines the fluid chamber 78 of the fluid reservoir tank 54, are provided as a part of a unitary, one-piece member. The fluid reservoir tank 54 is in fluid communication with the hydraulic cylinder housing 56 by a passageway 80. More specifically, the remote end of the passageway 80 with respect to the reservoir 70 has an enlarged area 82 with a timing port 86 and a compensation port 88, both of which are in fluid communication with the cylinder bore 60. The functions of the timing port 86 and the compensation port 88 are well known and will not be described further.

Referring now to FIGS. 9 to 16, a bicycle hydraulic brake operating device 110 is illustrated in accordance with a second embodiment. The main difference of the bicycle hydraulic brake operating device 110 from the bicycle hydraulic brake operating device 10 is arrangement of the hydraulic component as discussed below. In view of the similarity between the first and second embodiments, the parts of the second embodiment that are identical in function to the corresponding parts of the first embodiment will be given the same reference numerals as the parts of the first embodiment, but increased by one hundred. Moreover, the descriptions of the parts of the second embodiment that are identical to the parts of the first embodiment may be omitted for the sake of brevity.

In this second embodiment, the bicycle hydraulic brake operating device 110 basically includes a main body 114 and a brake lever 116, which is pivotally mounted to the main body 114 by a pivot pin 118 that defines a pivot axis P. Similar to the first embodiment, the brake lever 116 is provided with a pair of gearshift operating parts 120 and 122 connected to a gearshift control unit 124.

Figure 10:
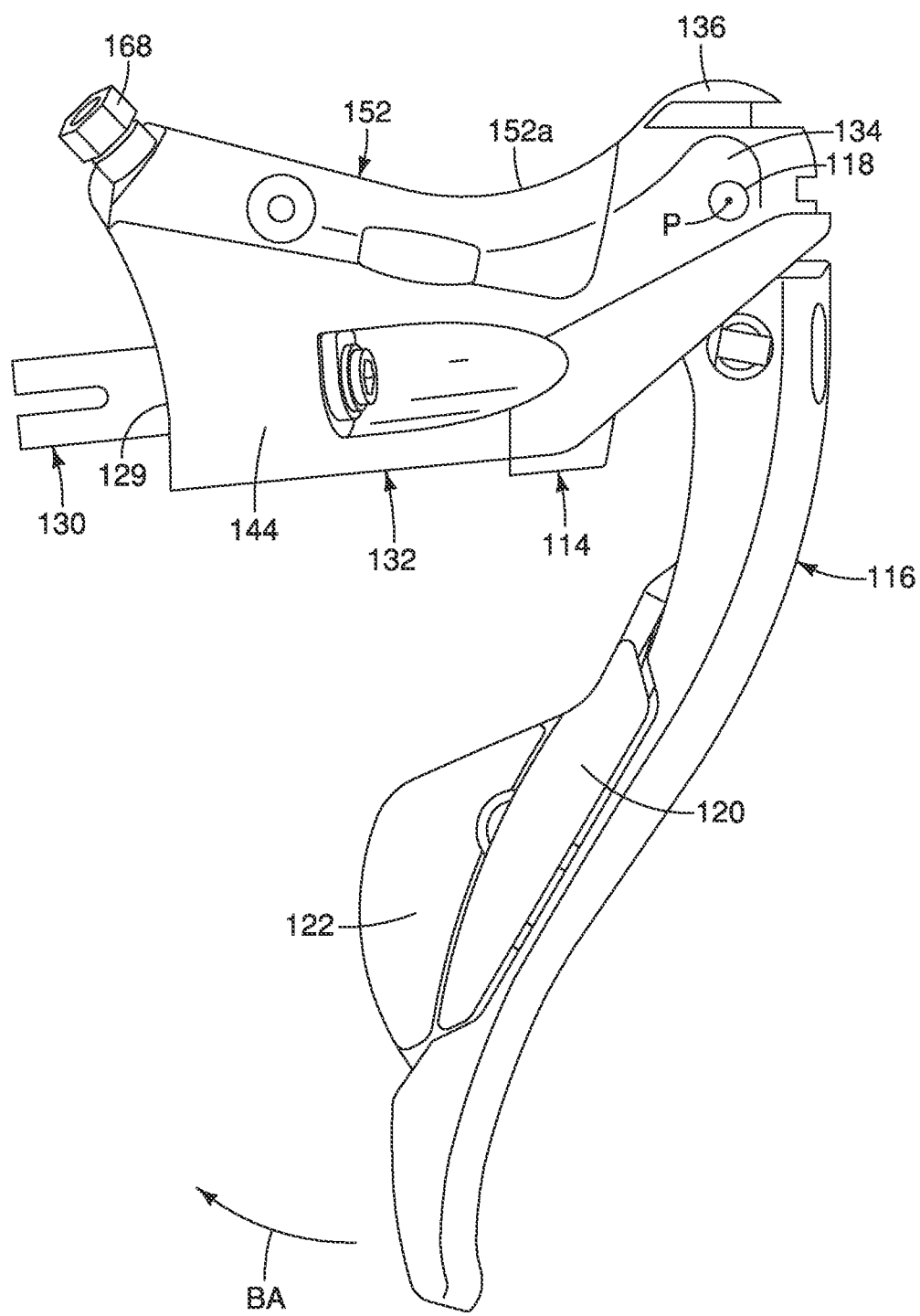
FIG. 10 is an outside elevational view of the bicycle hydraulic brake operating device illustrated in FIG. 9 with the grip cover removed.

As illustrated in FIG. 10, similar to the first embodiment, the main body 114 includes a handlebar mounting portion 129 provided with a mounting member 130, a gripping portion 132, a lever mounting portion 134 and a pommel portion 136. The mounting member 130 basically includes a clamping band 130a and a bolt 130b. The handlebar mounting portion 129 contacts the curved section 12a of the dropdown bicycle handlebar 12 when the bolt 130b is tightened to move the clamping band 130a towards the handlebar mounting portion 129. A grip cover 138 is stretched over at least the gripping portion 132 and a pommel portion 136.

The main body 114 also has a pair of lateral sidewalls 142 and 144 with a receiving cavity 146 formed between the lateral sidewalls 142 and 144. The main body 114 also has an insertion opening 148 formed in a top surface 150 of the main body 114. Thus, the top surface 150 of the main body 114 defines the insertion opening 148 of the receiving cavity 146. In this way, the insertion opening 148 is located between the lateral sidewalls 142 and 144 as seen from the top plan view of FIG. 11.

Figure 14:
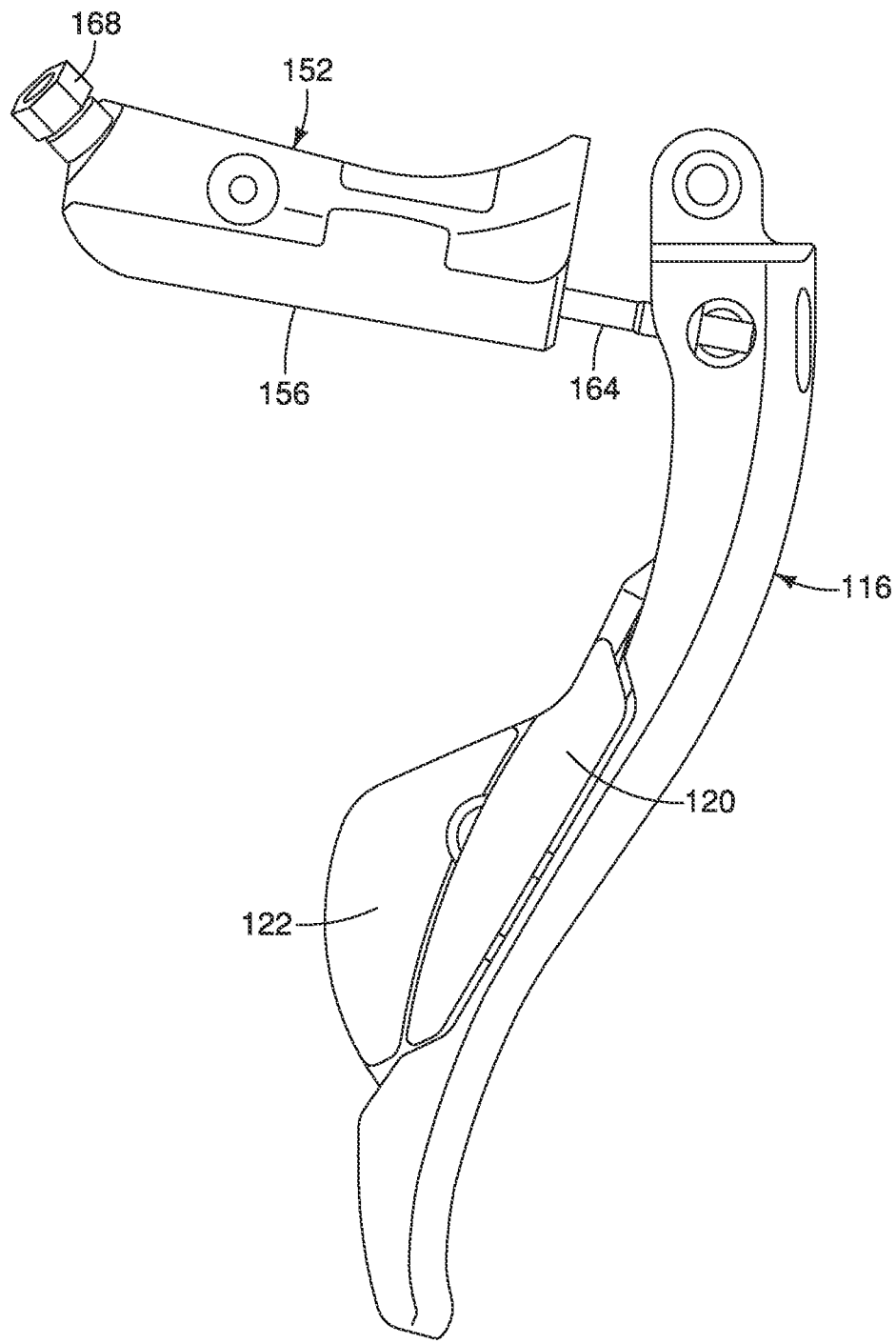
FIG. 14 is an outside elevational view of the hydraulic unit with the brake lever operatively attached to the master piston via the connecting rod.
Figure 15:
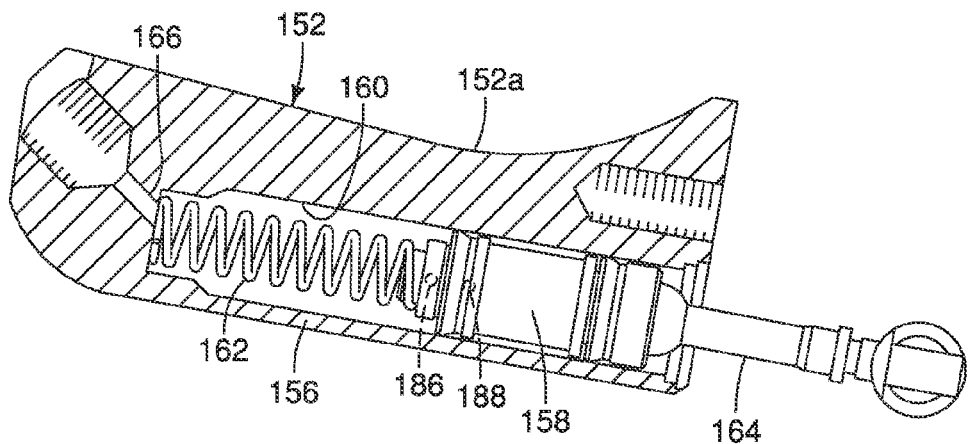
FIG. 15 is a center longitudinal cross sectional view of the hydraulic unit of the bicycle hydraulic brake operating device illustrated in FIGS. 9 to 11 as seen along section line A2-A2 of FIG. 12.
Figure 16:
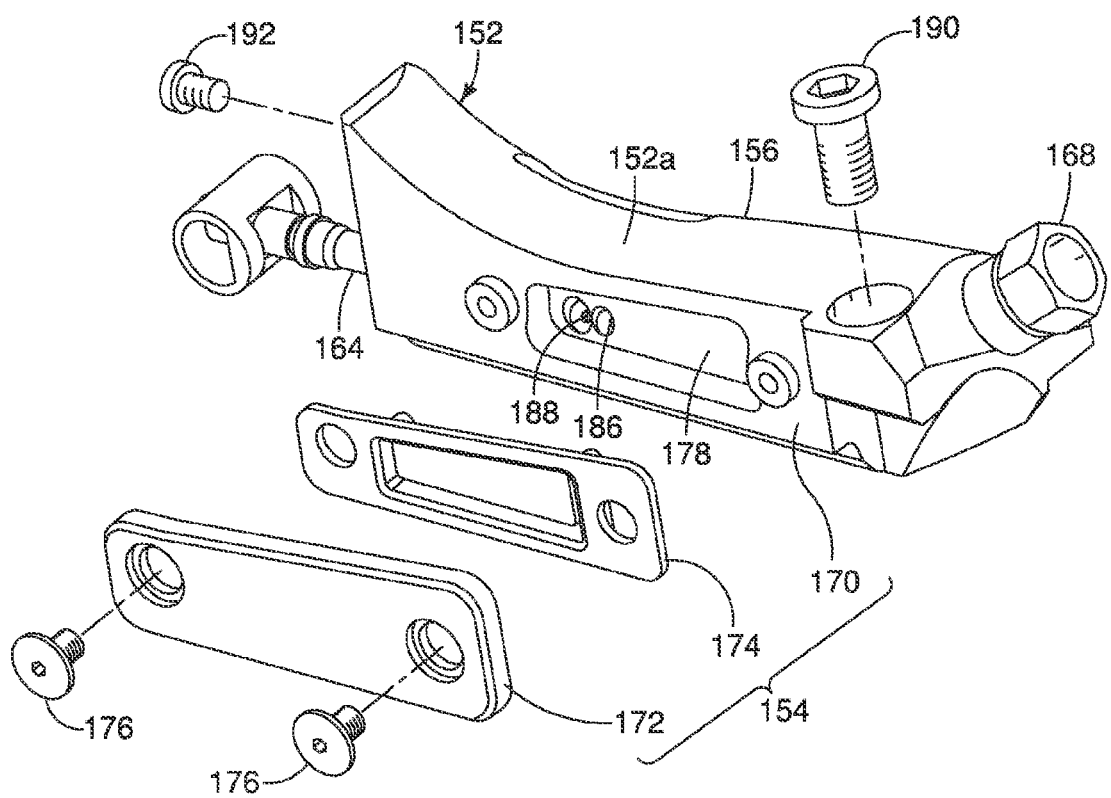
FIG. 16 is a partially exploded perspective view of the hydraulic unit of the bicycle hydraulic brake operating device illustrated in FIGS. 9 to 11.
Figure 17:
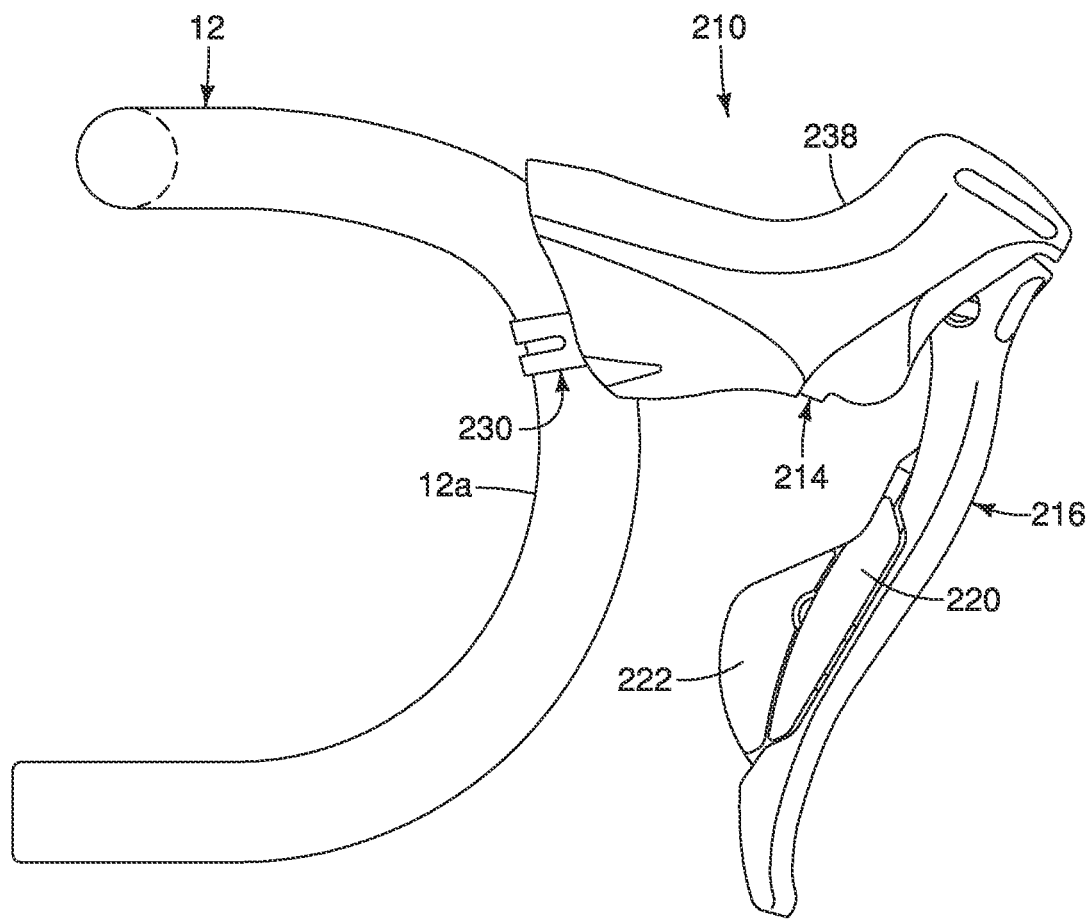
FIG. 17 is an outside elevational view of a dropdown bicycle handlebar that is equipped with a bicycle hydraulic brake operating device in accordance with a third embodiment.

Referring mainly to FIGS. 14 to 16, the bicycle hydraulic brake operating device 110 further includes a hydraulic unit 152 and a fluid reservoir tank 154. As explained below, the hydraulic unit 152 is in fluid communication with the fluid reservoir tank 154 such that the reservoir tank 154 supplies hydraulic fluid, which is contained in the reservoir tank 154, to the hydraulic unit 152. As illustrated in FIG. 15, the hydraulic unit 152 basically includes a hydraulic cylinder housing 156 and a piston 158. The piston 158 is movably disposed within a cylinder bore 160 of the hydraulic cylinder housing 156 in a reciprocal manner in response to operation of the brake lever 116. A biasing element 162 is disposed in the cylinder bore 160 for biasing the piston 158 to a rest position.

Like in the first embodiment, the fluid reservoir tank 154 is supported by the main body 114 at a location spaced from an area directly above the hydraulic cylinder housing 156 while the bicycle hydraulic brake operating device 110 is in an installed position. Here, the fluid reservoir tank 154 is at least partially disposed on the main body 114 at one of lateral sides of the hydraulic cylinder housing 156 while the bicycle hydraulic brake operating device 110 is in an installed position. Also the fluid reservoir tank 154 is disposed on the main body 114 rearward of the pivot axis P of the brake lever 116 while the bicycle hydraulic brake operating device 110 is in the installed position.

Figure 11:
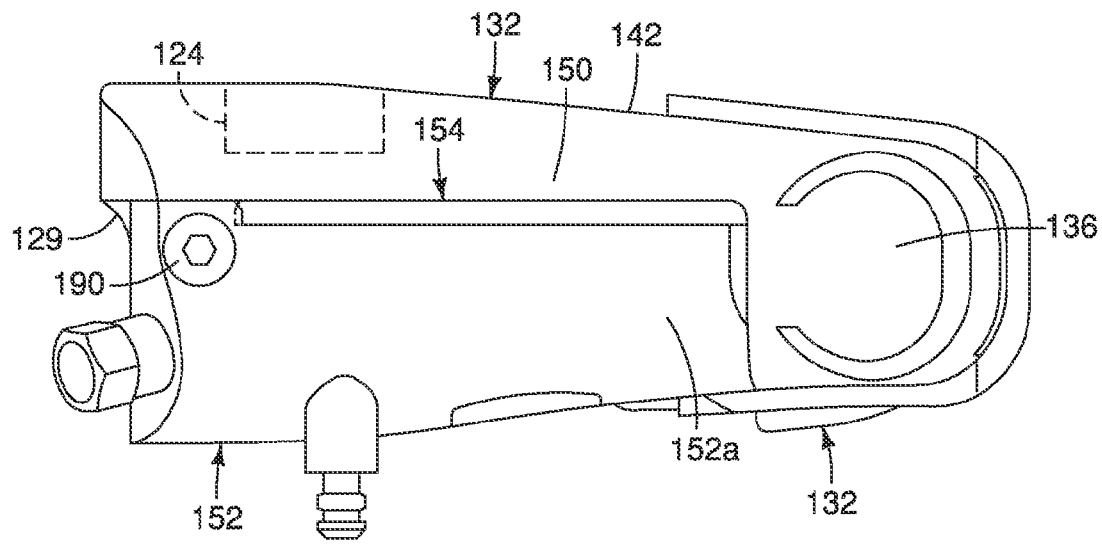
FIG. 11 is a top plan view of the bicycle hydraulic brake operating device illustrated in FIGS. 9 and 10 with the grip cover removed.
Figure 12:
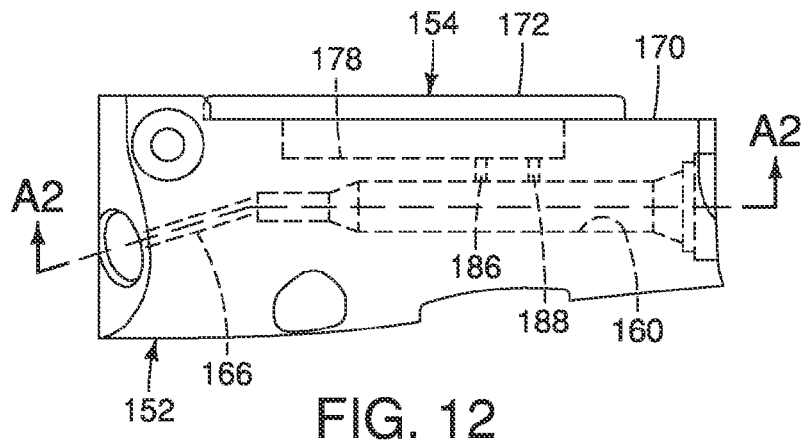
FIG. 12 is a top plan view of the hydraulic unit of the bicycle hydraulic brake operating device illustrated in FIGS. 9 to 11.
Figure 13:
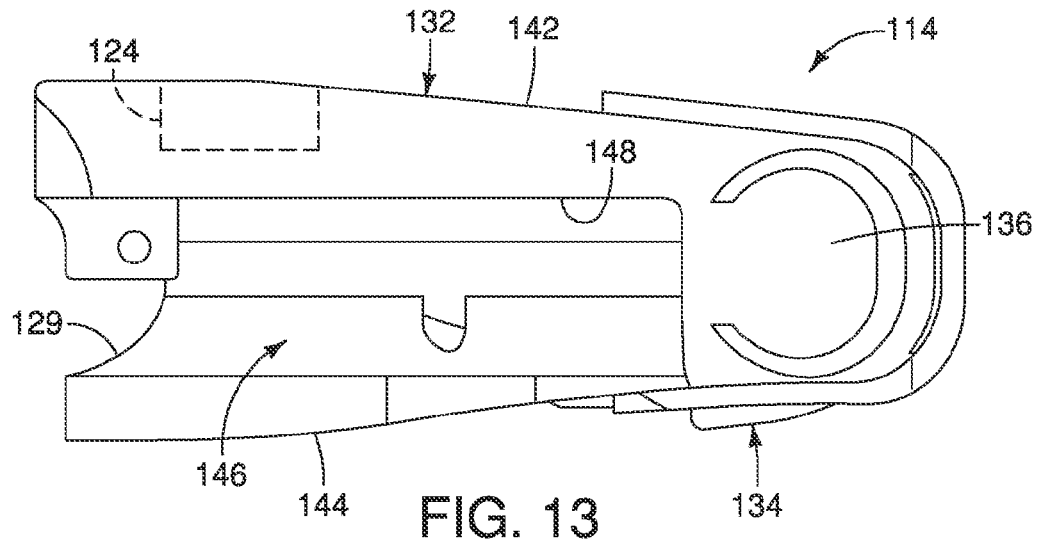
FIG. 13 is a top plan view of the main body (i.e., the drop down handlebar bracket) of the bicycle hydraulic brake operating device illustrated in FIGS. 9 to 11 with the hydraulic unit removed.

As illustrated in FIG. 11, the hydraulic unit 152 is disposed within the receiving cavity 146 of the gripping portion 132 of the main body 114. Thus, the hydraulic unit 152 is dimensioned relative to the insertion opening 148 to be inserted into the receiving cavity 146 via the insertion opening 148. In this way, a top surface 152a of the hydraulic cylinder housing 156 of the hydraulic unit 152 forms a seat of the gripping portion 132 for the rider's hand. In other words, the top surface 152a of the hydraulic cylinder housing 156 closes the insertion opening 148 and smoothly mates with top surface 150 of the main body 114. As illustrated in FIG. 11, the insertion opening 148 is located between the lateral sidewalks 142 and 144 at the top surface 150 of the main body 114. Alternatively, the insertion opening can be relocated between the lateral sidewalk 142 and 144 at a bottom surface of the main body 114 such that the hydraulic unit 152 is inserted into the main body 114 from below.

The hydraulic cylinder housing 156 has an outlet port 166 that extends from the cylinder bore 160 to the outside of the hydraulic cylinder housing 156. The outlet port 166 is partially threaded to receive a hydraulic hose connector 168 for attaching a hydraulic hose. Thus, as the brake lever 116 is pivoted around the pivot axis P relative to the main body 114, the piston 158 moves within the cylinder bore 160 of the hydraulic cylinder housing 156 against the force of the biasing element 162 to force hydraulic fluid out of the cylinder bore 160 through the outlet port 166.

As illustrated in FIG. 16, the fluid reservoir tank 154 includes a reservoir 170, a cover 172 and a flexible diaphragm 174. The cover 172 and the flexible diaphragm 174 are attached to the reservoir 170 by a pair of screws 176 such that the cover 172 covers a hydraulic fluid chamber 178 defined by the reservoir 170. The flexible diaphragm 174 includes a protruding part that is extends into the hydraulic fluid cavity 178. In the first illustrated embodiment, the hydraulic cylinder housing 156 and the reservoir 170, which defines the fluid chamber 178 of the fluid reservoir tank 154, are provided as a part of a unitary, one-piece member. As illustrated in FIG. 15, the fluid reservoir tank 154 is in fluid communication with the hydraulic cylinder housing 156 by a timing port 186 and a compensation port 188, both of which are in fluid communication with the cylinder bore 160.

Referring now to FIGS. 17 to 24, a bicycle hydraulic brake operating device 210 is illustrated in accordance with a third embodiment. The main difference of the bicycle hydraulic brake operating device 210 from the bicycle hydraulic brake operating device 10 is arrangement of the hydraulic component as discussed below. In view of the similarity between the third embodiment and the prior embodiments, the parts of the third embodiment that are identical in function to the corresponding parts of the first embodiment will be given the same reference numerals as the parts of the first embodiment, but increased by two hundred. Moreover, the descriptions of the parts of the third embodiment that are identical to the parts of the first embodiment may be omitted for the sake of brevity.

In this third embodiment, the bicycle hydraulic brake operating device 210 basically includes a main body 214 and a brake lever 216, which is pivotally mounted to the main body 214 by a pivot pin 218 that defines a pivot axis P. Similar to the first embodiment, the brake lever 216 is provided with a pair of gearshift operating parts 220 and 222 connected to a gearshift control unit 224.

Figure 18:
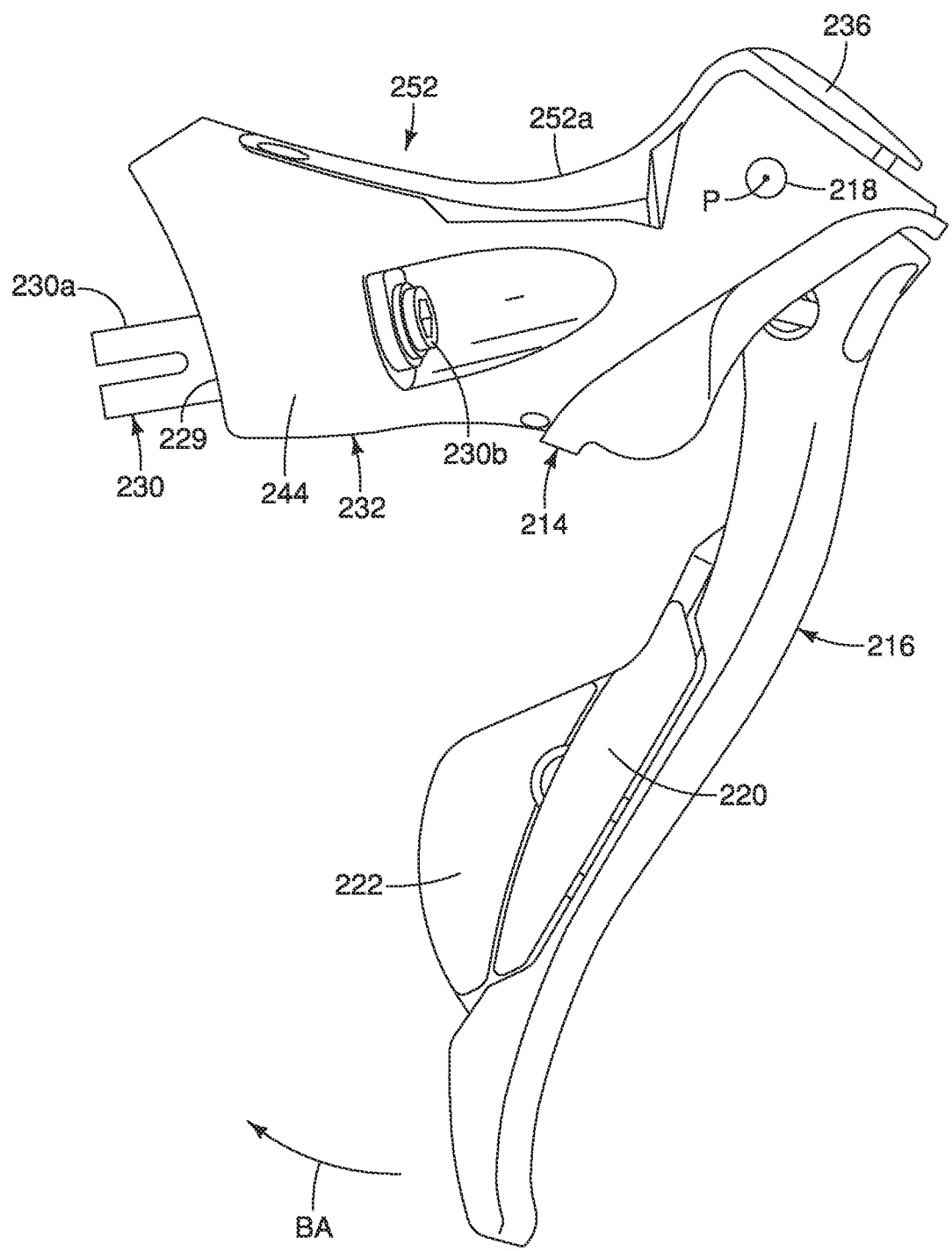
FIG. 18 is an outside elevational view of the bicycle hydraulic brake operating device illustrated in FIG. 17 with the grip cover removed.

As illustrated in FIG. 18, similar to the first embodiment, the main body 214 includes a handlebar mounting portion 229 provided with a mounting member 230, a gripping portion 232, a lever mounting portion 234 and a pommel portion 236. The mounting member 230 basically includes a clamping band 230a and a bolt 230b. The handlebar mounting portion 229 contacts the curved section 12a of the dropdown bicycle handlebar 12 when the bolt 230b is tightened to move the clamping band 230a towards the a handlebar mounting portion 229. A grip cover 238 is stretched over at least the gripping portion 232 and a pommel portion 236.

The main body 214 also has a pair of lateral sidewalk 242 and 244 with a receiving cavity 246 formed between the lateral sidewalk 242 and 244. The main body 214 also has an insertion opening 248 formed in a top surface 250 of the main body 214. Thus, the top surface 250 of the main body 214 defines the insertion opening 248 of the receiving cavity 246. In this way, the insertion opening 248 is located between the lateral sidewalk 242 and 244 as seen from the top plan view of FIG. 19.

Figure 23:
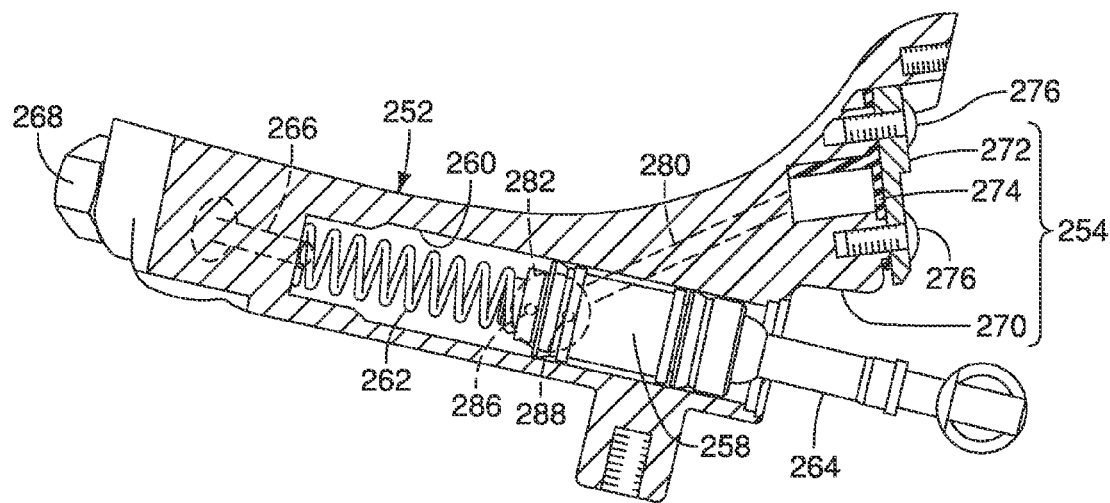
FIG. 23 is a center longitudinal cross sectional view of the hydraulic unit of the bicycle hydraulic brake operating device illustrated in FIGS. 17 to 19 as seen along section line A3-A3 of FIG. 20.

As explained below, the hydraulic unit 252 is in fluid communication with the fluid reservoir tank 254 such that the reservoir tank 254 supplies hydraulic fluid, which is contained in the reservoir tank 254, to the hydraulic unit 252. As illustrated in FIG. 23, the hydraulic unit 252 basically includes a hydraulic cylinder housing 256 and a piston 258. The piston 258 is movably disposed within a cylinder bore 260 of the hydraulic cylinder housing 256 in a reciprocal manner in response to operation of the brake lever 216. A biasing element 262 is disposed in the cylinder bore 260 for biasing the piston 258 to a rest position.

Figure 22:
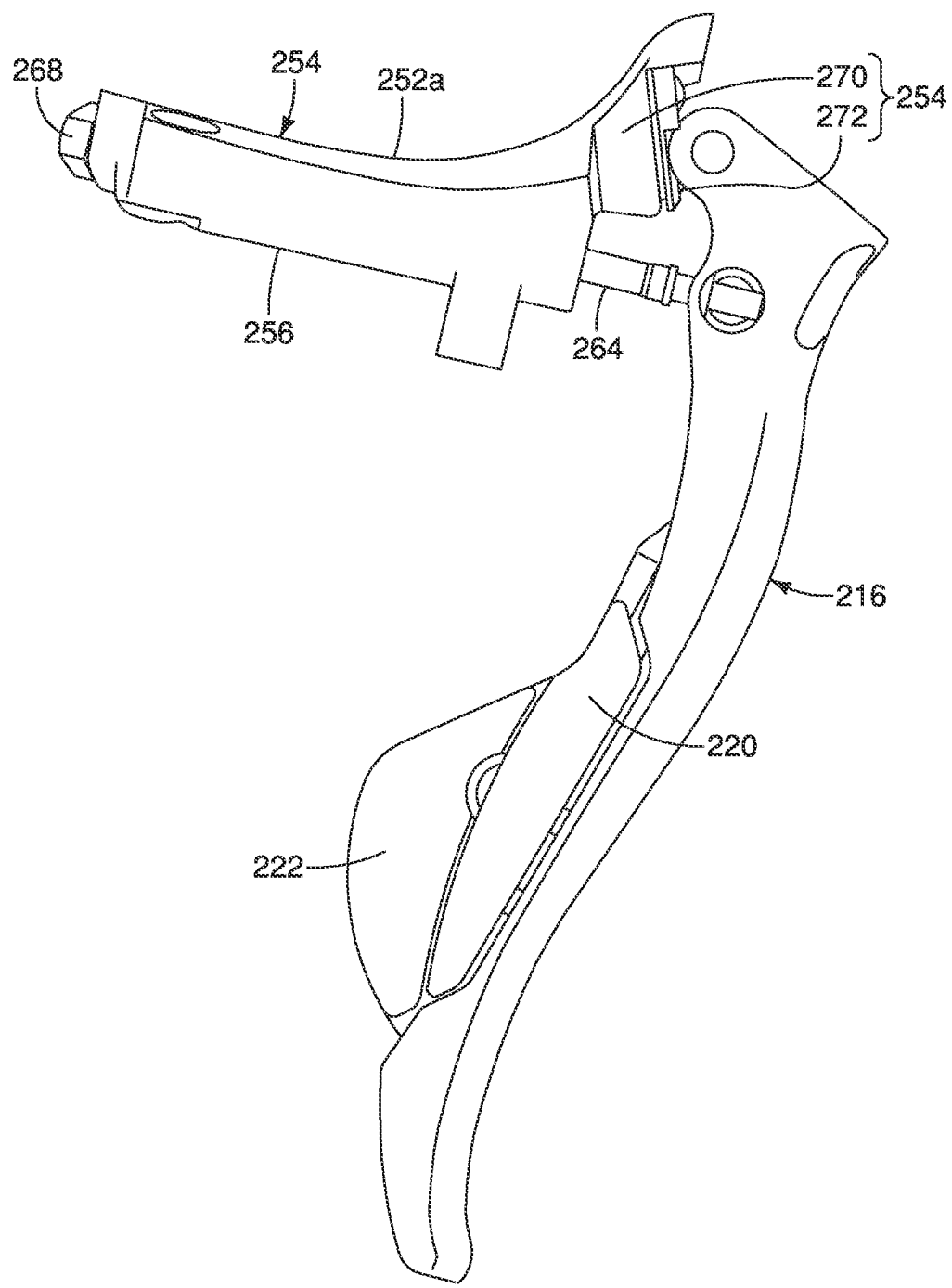
FIG. 22 is an outside elevational view of the hydraulic unit with the brake lever operatively attached to the master piston via the connecting rod.
Figure 24:
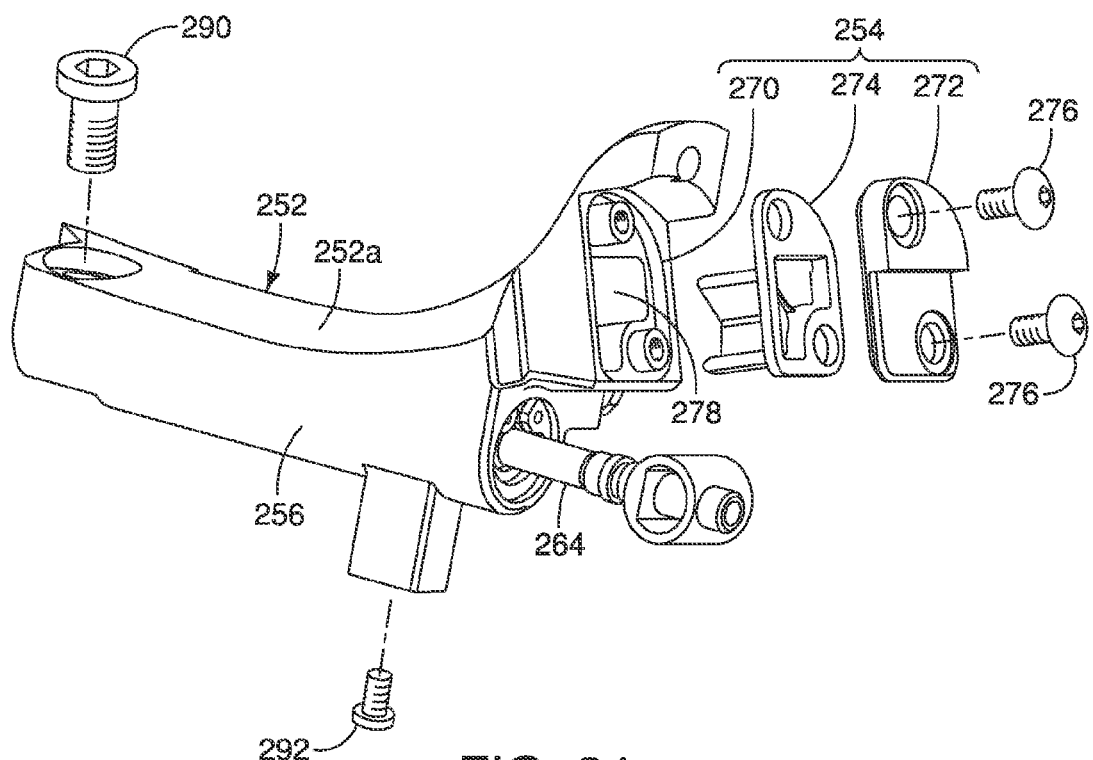
FIG. 24 is a partially exploded perspective view of the hydraulic unit of the bicycle hydraulic brake operating device illustrated in FIGS. 17 to 19.

Referring mainly to FIGS. 22 to 24, the bicycle hydraulic brake operating device 210 further includes a hydraulic unit 252 and a fluid reservoir tank 254. Like in the first embodiment, the fluid reservoir tank 254 is supported by the main body 214 at a location spaced from an area directly above the hydraulic cylinder housing 256 while the bicycle hydraulic brake operating device 210 is in an installed position. Here, the fluid reservoir tank 254 is disposed at an upper side of the main body 214 relative to the pivot axis P of the brake lever 216 while the bicycle hydraulic brake operating device 210 is in the installed position. Also the fluid reservoir tank 254 is disposed on the main body 214 rearward of the pivot axis P of the brake lever 216 while the bicycle hydraulic brake operating device 210 is in the installed position.

Figure 19:
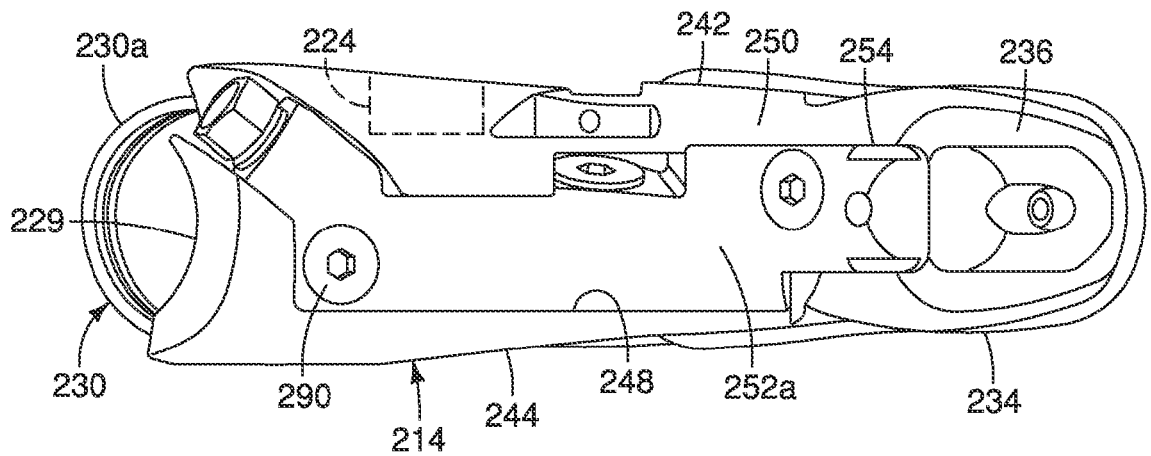
FIG. 19 is a top plan view of the bicycle hydraulic brake operating device illustrated in FIGS. 17 and 18 with the grip cover removed.
Figure 20:
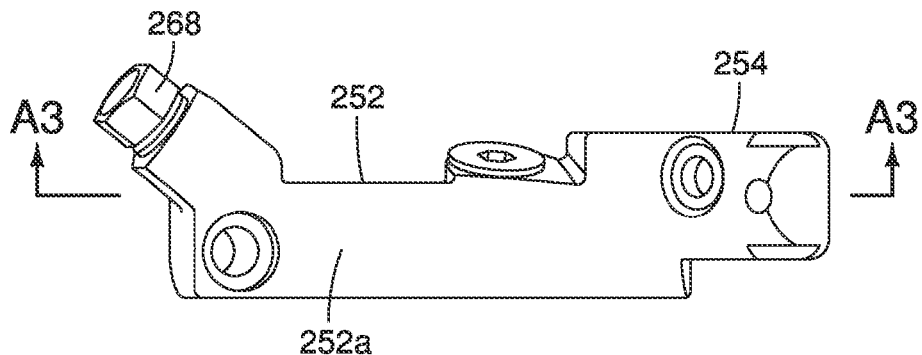
FIG. 20 is a top plan view of the hydraulic unit of the bicycle hydraulic brake operating device illustrated in FIGS. 17 to 19.
Figure 21:
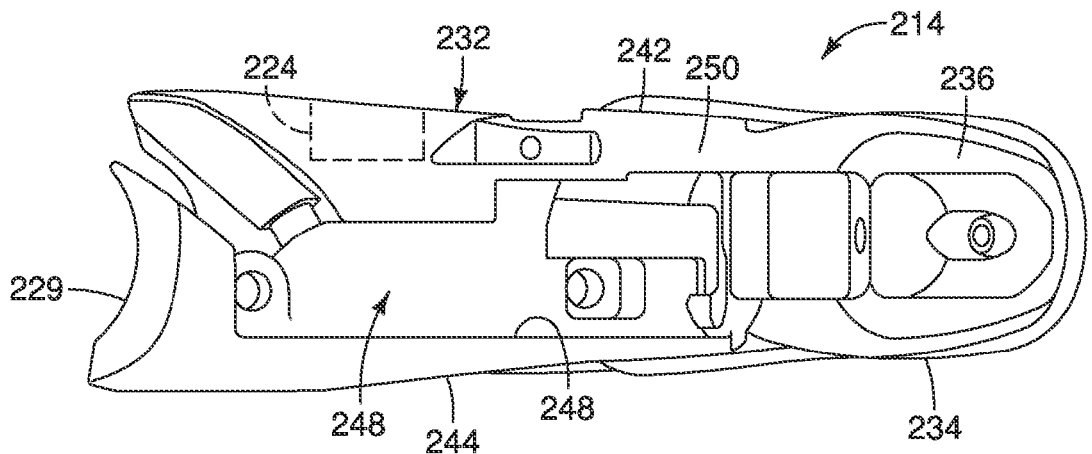
FIG. 21 is a top plan view of the main body (i.e., the drop down handlebar bracket) of the bicycle hydraulic brake operating device illustrated in FIGS. 17 to 19 with the hydraulic unit removed.

As illustrated in FIG. 19, the hydraulic unit 252 is disposed within the receiving cavity 246 of the gripping portion 232 of the main body 214. Thus, the hydraulic unit 252 is dimensioned relative to the insertion opening 248 to be inserted into the receiving cavity 246 via the insertion opening 248. In this way, a top surface 252a of the hydraulic cylinder housing 256 of the hydraulic unit 252 forms a seat of the gripping portion 232 for the rider's hand. In other words, the top surface 252a of the hydraulic cylinder housing 256 closes the insertion opening 248 and smoothly mates with the top surface 250 of the main body 214. As illustrated in FIG. 19, the insertion opening 248 is located between the lateral sidewalk 242 and 244 at the top surface 250 of the main body 214. Alternatively, the insertion opening can be relocated between the lateral sidewalk 242 and 244 at a bottom surface of the main body 214 such that the hydraulic unit 252 is inserted into the main body 214 from below.

The hydraulic cylinder housing 256 has an outlet port 266 that extends from the cylinder bore 260 to the outside of the hydraulic cylinder housing 256. The outlet port 266 is partially threaded to receive a hydraulic hose connector 268 for attaching a hydraulic hose. Thus, as the brake lever 216 is pivoted around the pivot axis P relative to the main body 214, the piston 258 moves within the cylinder bore 260 of the hydraulic cylinder housing 256 against the force of the biasing element 262 to force hydraulic fluid out of the cylinder bore 260 through the outlet port 266.

As illustrated in FIGS. 23 and 24, the fluid reservoir tank 254 includes a reservoir 270, a cover 272 and a flexible diaphragm 274. The cover 272 and the flexible diaphragm 274 are attached to the reservoir 270 by a pair of screws 276 such that the cover 272 covers a hydraulic fluid chamber 278 defined by the reservoir 270. The flexible diaphragm 274 includes a protruding part that is extends into the hydraulic fluid cavity 278. In the first illustrated embodiment, the hydraulic cylinder housing 256 and the reservoir 270, which defines the fluid chamber 278 of the fluid reservoir tank 254, are provided as a part of a unitary, one-piece member. The fluid reservoir tank 254 is in fluid communication with the hydraulic cylinder housing 256 by passageway 280 having an enlarged area 282 with a timing port 286 and a compensation port 288 at the remote end of the passageway 280 with respect to the reservoir 270. The timing port 286 and the compensation port 288 are in fluid communication with the cylinder bore 260.

Referring now to FIGS. 25 to 29, a bicycle hydraulic brake operating device 310 is illustrated in accordance with a fourth embodiment. The main difference of the bicycle hydraulic brake operating device 310 from the bicycle hydraulic brake operating device 10 is arrangement of the hydraulic component as discussed below. In view of the similarity between the fourth embodiment and the prior embodiments, the parts of the fourth embodiment that are identical in function to the corresponding parts of the first embodiment will be given the same reference numerals as the parts of the first embodiment, but increased by three hundred. Moreover, the descriptions of the parts of the fourth embodiment that are identical to the parts of the first embodiment may be omitted for the sake of brevity.

Figure 25:
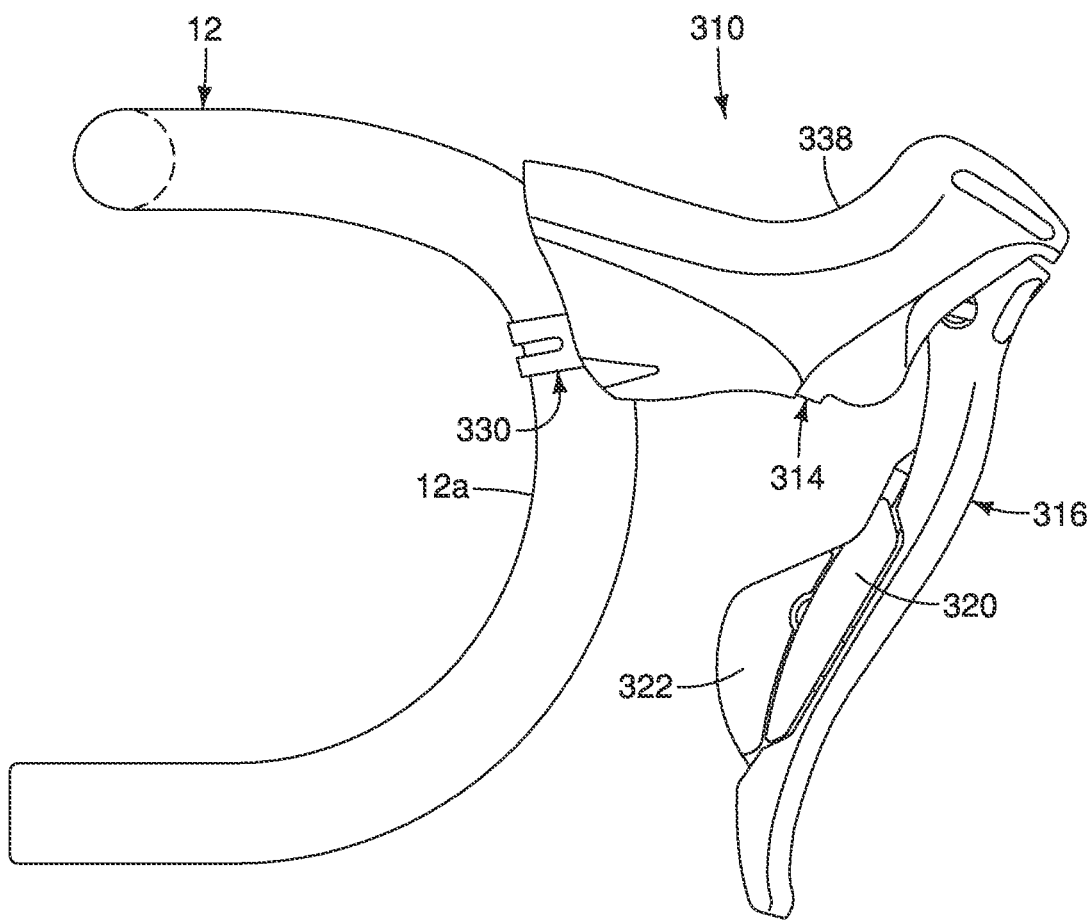
FIG. 25 is an outside elevational view of a dropdown bicycle handlebar that is equipped with a bicycle hydraulic brake operating device in accordance with a fourth embodiment.
Figure 26:
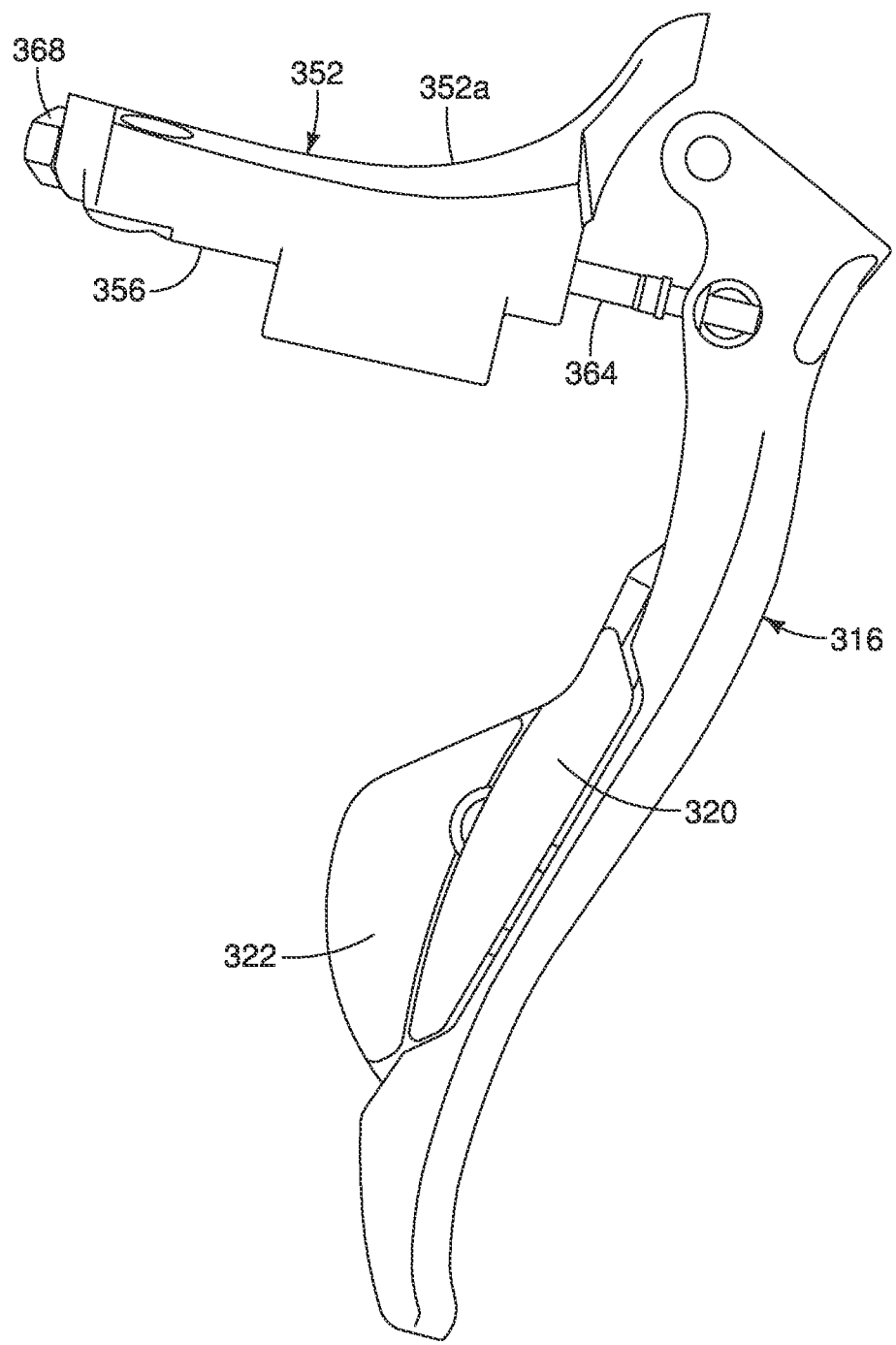
FIG. 26 is an outside elevational view of the hydraulic unit of the bicycle hydraulic brake operating device illustrated in FIG. 25 with the brake lever operatively attached to the master piston via the connecting rod.

In this fourth embodiment, the bicycle hydraulic brake operating device 310 basically includes a main body 314 and a brake lever 316, which is pivotally mounted to the main body 314 by a pivot pin 318 that defines a pivot axis P. Similar to the first embodiment, the brake lever 316 is provided with a pair of gearshift operating parts 320 and 322 connected to a gearshift control unit 324. The main body 314 is nearly identical to the main body 214, except for changes in shape to accommodate a modified hydraulic unit 352 and a modified fluid reservoir tank 354, and thus, the main body 314 will not be discussed herein. A grip cover 338 is stretched over at least its gripping portion and its pommel portion as seen in FIG. 25.

Figure 27:
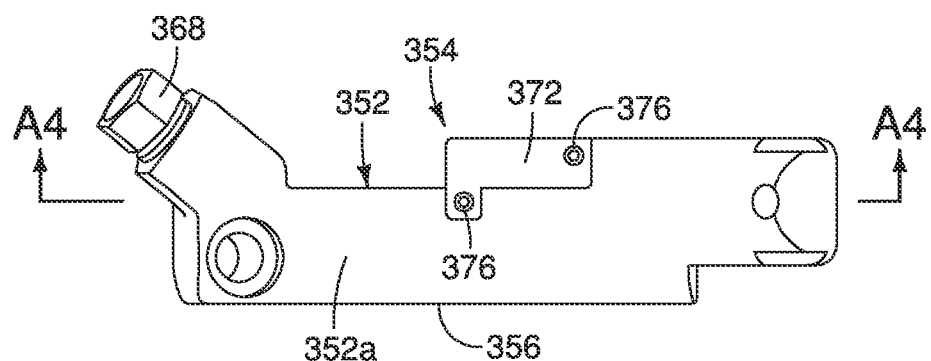
FIG. 27 is a lop plan view of the hydraulic unit of the bicycle hydraulic brake operating device illustrated in FIGS. 25 and 26.
Figure 28:
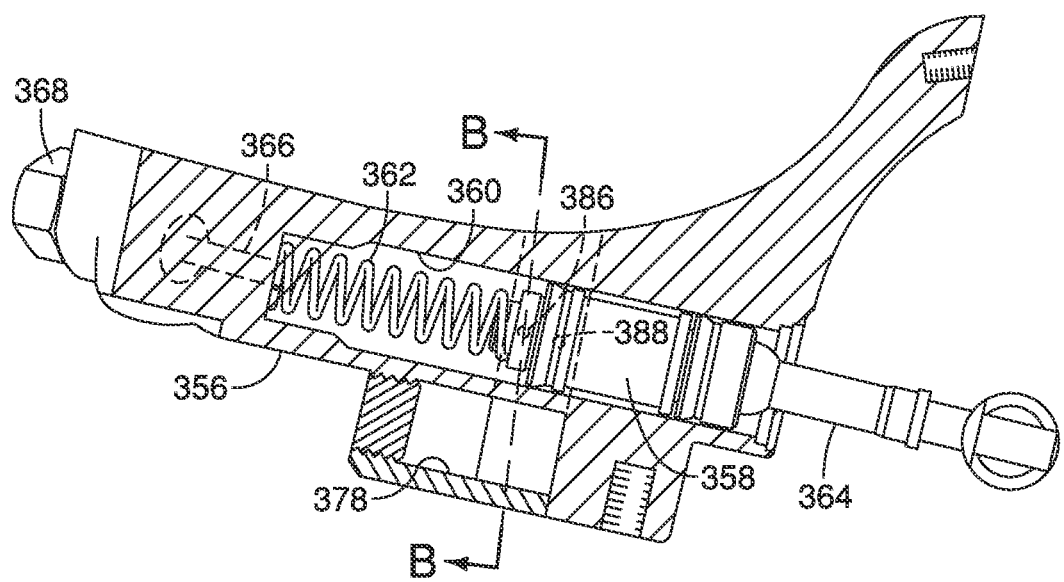
FIG. 28 is a center longitudinal cross sectional view of the hydraulic unit of the bicycle hydraulic brake operating device illustrated in FIGS. 25 and 26 as seen along section line A4-A4 of FIG. 27.
Figure 29:
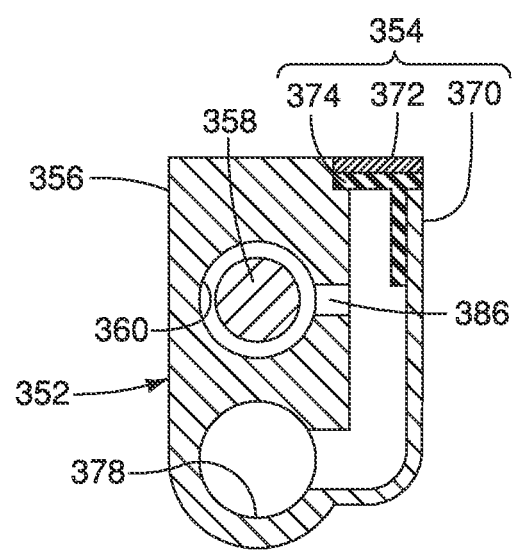
FIG. 29 is a transverse cross sectional view of the hydraulic unit of the bicycle hydraulic brake operating device illustrated in FIGS. 25 and 26 as seen along section line B-B of FIG. 28.

Referring mainly to FIGS. 27 to 29, the hydraulic unit 352 and the fluid reservoir tank 354 will now be discussed. The hydraulic unit 352 is the same as the hydraulic unit 252, except for the location of the reservoir tank 354 and the modifications to the hydraulic unit 352 to accommodate the new location of the reservoir tank 354. The hydraulic unit 352 is disposed within a receiving cavity of the main body 314 in the same way as the third embodiment. In this way, a top surface 352a of the hydraulic cylinder housing 356 of the hydraulic unit 352 forms a seat for the rider's hand.

As explained below, the hydraulic unit 352 is in fluid communication with the fluid reservoir tank 354 such that the reservoir tank 354 supplies hydraulic fluid, which is contained in the reservoir tank 354, to the hydraulic unit 352. As illustrated in FIG. 27, the hydraulic unit 352 basically includes a hydraulic cylinder housing 356 and a piston 358. The piston 358 is movably disposed within a cylinder bore 360 of the hydraulic cylinder housing 356 in a reciprocal manner in response to operation of the brake lever 316. A biasing element 362 is disposed in the cylinder bore 360 for biasing the piston 358 to a rest position.

Like in the first embodiment, the fluid reservoir tank 354 is supported by the main body 314 at a location spaced from an area directly above the hydraulic cylinder housing 356 while the bicycle hydraulic brake operating device 310 is in an installed position. Here, the fluid reservoir tank 354 is disposed at a lower side of the main body 314 relative to the pivot axis P of the brake lever 316 while the bicycle hydraulic brake operating device 310 is in the installed position. Also the fluid reservoir tank 354 is disposed on the main body 314 rearward of the pivot axis P of the brake lever 316 while the bicycle hydraulic brake operating device 310 is in the installed position.

The hydraulic cylinder housing 356 has an outlet port 366 that extends from the cylinder bore 360 to the outside of the hydraulic cylinder housing 356. The outlet port 366 is partially threaded to receive a hydraulic hose connector 368 fir attaching a hydraulic hose. Thus, as the brake lever 316 is pivoted around the pivot axis P relative to the main body 314, the piston 358 moves within the cylinder bore 360 of the hydraulic cylinder housing 356 against the force of the biasing element 362 to force hydraulic fluid out of the cylinder bore 360 through the outlet port 366.

As illustrated in FIGS. 27 to 28, the fluid reservoir tank 354 includes a reservoir 370, a cover 372 and a flexible diaphragm 374. The cover 372 and the flexible diaphragm 374 are attached to the reservoir 370 by a pair of screws 376 such that the cover 372 covers a hydraulic fluid chamber 378 defined by the reservoir 370. Here, the hydraulic fluid chamber 378 has an L-shape as viewed in a transverse cross section as illustrated in FIG. 29. The flexible diaphragm 374 includes a protruding part that is extends into the hydraulic fluid cavity 378. In the first illustrated embodiment, the hydraulic cylinder housing 356 and the reservoir 370, which defines the fluid chamber 378 of the fluid reservoir tank 354, are provided as a part of a unitary, one-piece member. The fluid reservoir tank 354 is in fluid communication with the hydraulic cylinder housing 356 by a timing port 386 and a compensation port 388. The timing port 386 and the compensation port 388 are in fluid communication with the cylinder bore 360.

Figure 30:
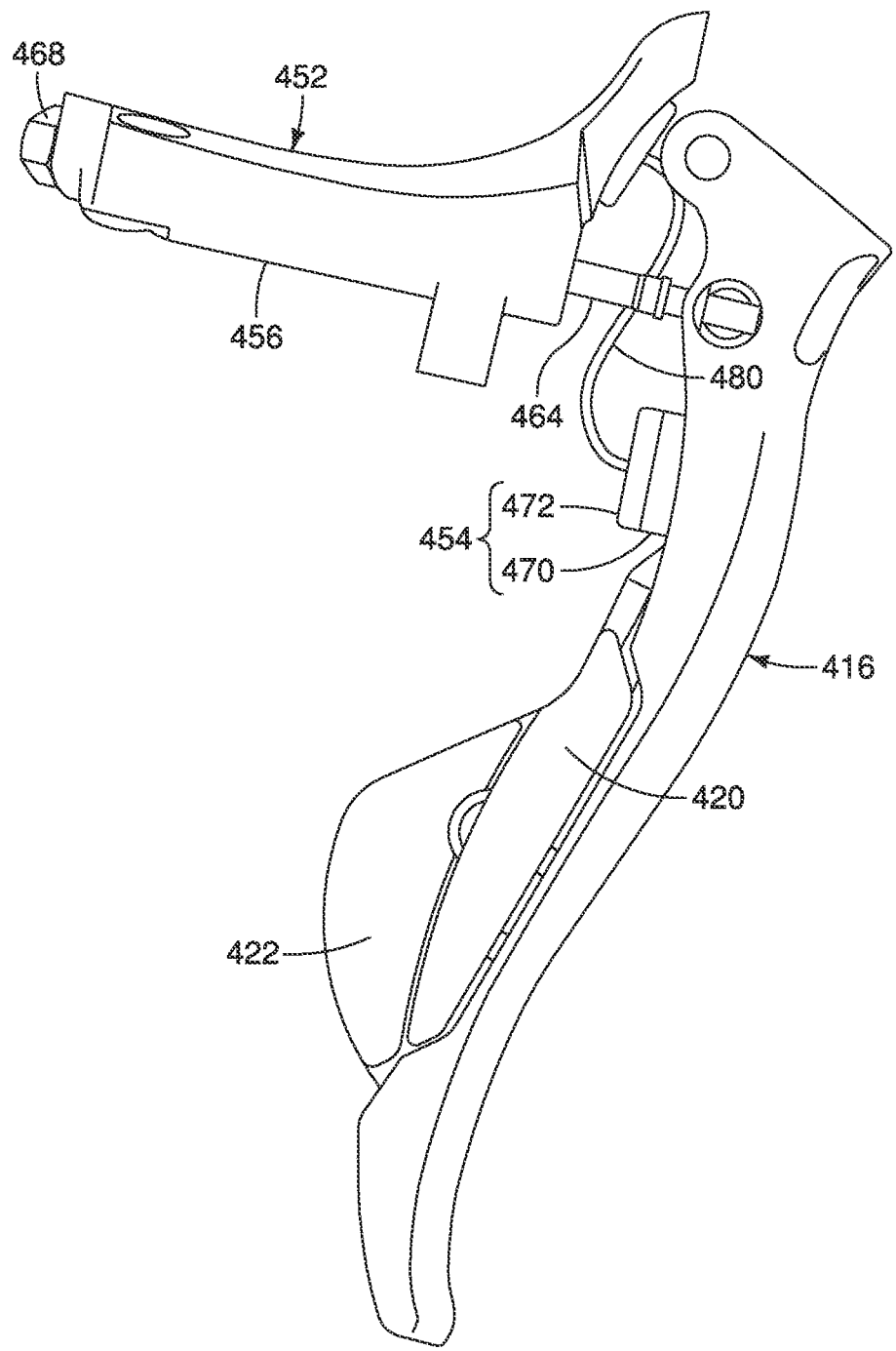
FIG. 30 is an outside elevational view of a modified hydraulic unit and a modified brake lever in accordance with a fifth embodiment for use with the main body (i.e., the drop down handlebar bracket) of the bicycle hydraulic brake operating device illustrated in FIG. 17.

Referring now to FIG. 30, a modified brake lever 416 and a modified hydraulic unit 452 are illustrated in accordance with a fifth embodiment. The brake lever 416 and the hydraulic unit 452 are configured to be used in the main body 214 of the third embodiment. Here, a fluid reservoir tank 454 is mounted on the brake lever 416. In view of the similarity between the fifth embodiment and the prior embodiments, the parts of the fifth embodiment that are identical in function to the corresponding parts of the first embodiment will be given the same reference numerals as the parts of the first embodiment, but increased by four hundred. Moreover, the descriptions of the parts of the fifth embodiment that are identical to the parts of the first embodiment may be omitted for the sake of brevity.

In this fifth embodiment, similar to the first embodiment, the brake lever 416 is provided with a pair of gearshift operating parts 420 and 422. The hydraulic unit 452 basically includes a hydraulic cylinder housing 456 and a piston (not shown). The fluid reservoir tank 454 is supported by the brake lever 416 at a location spaced from an area directly above the hydraulic cylinder housing 456 while the bicycle hydraulic brake operating device 410 is in an installed position. Similar to the prior embodiments, the fluid reservoir tank 454 includes a reservoir 470, a cover 472 and a flexible diaphragm (not shown). The hydraulic fluid chamber of the fluid reservoir tank 454 is in fluid communication with the cylinder bore of the hydraulic cylinder housing 456 via a flexible hose 480, which is connected to a port of the hydraulic cylinder housing 456. The construction of the hydraulic cylinder housing 456 is identical to the hydraulic cylinder housing 256, except that the reservoir has been separated from the hydraulic cylinder housing 456 and moved to the brake lever 416.

While the present invention has been explained as a bicycle hydraulic brake operating device, the present invention can also apply to other bicycle component operating device. For example, the present invention can apply to a bicycle hydraulic component operating device for bicycle speed changing device, e.g. derailleur, internal hub and so on. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle hydraulic component operating device. Accordingly, these terms, as utilized to describe the bicycle hydraulic component operating device should be interpreted relative to a bicycle equipped with the bicycle hydraulic component operating device as used in an upright riding position on a horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the bicycle field from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic component operating device comprising:
   a main body including a handlebar mounting portion and a gripping portion;
   an elastomeric grip cover disposed over at least the gripping portion;
   a hydraulic cylinder housing disposed within the gripping portion of the main body;
   a piston movably disposed within the hydraulic cylinder housing;
   an operating lever pivotally disposed around a pivot axis relative to the main body to move the piston within the hydraulic cylinder housing in response to pivotal movement of the operating lever relative to the main body, the pivot axis extending in a lateral direction with respect to the gripping portion; and
   a fluid reservoir tank in fluid communication with the hydraulic cylinder housing by at least one reservoir port extending along the lateral direction, the fluid reservoir tank being at least partially disposed on the main body at one of lateral sides of the hydraulic cylinder housing with respect to the lateral direction of the gripping portion while the bicycle hydraulic component operating device is in an installed position.

2. The bicycle hydraulic component operating device according to claim 1, wherein
   the hydraulic cylinder housing and a fluid chamber of the fluid reservoir tank are provided as a part of a unitary member.

3. The bicycle hydraulic component operating device according to claim 1, wherein
   the fluid reservoir tank is at least partially disposed at a location rearward of the pivot axis of the operating lever while the bicycle hydraulic component operating device is in the installed position.

4. A bicycle hydraulic component operating device comprising:
   a main body including a handlebar mounting portion and a gripping portion;
   a hydraulic cylinder housing disposed within the gripping portion of the main body;
   a piston movably disposed within the hydraulic cylinder housing;
   an operating lever pivotally disposed around a pivot axis relative to the main body to move the piston within the hydraulic cylinder housing in response to pivotal movement of the operating lever relative to the main body; and
   a fluid reservoir tank in fluid communication with the hydraulic cylinder housing, the fluid reservoir tank being supported by one of the main body and the operating lever at a location spaced from an area directly above the hydraulic cylinder housing while the bicycle hydraulic component operating device is in an installed position, the fluid reservoir tank being at least partially disposed on the main body at a lower side relative to the hydraulic cylinder housing while the bicycle hydraulic component operating device is in the installed position.

5. The bicycle hydraulic component operating device according to claim 1, wherein
   the bicycle hydraulic component operating device is a bicycle brake operating device.

6. A bicycle hydraulic component operating device comprising:
   a main body including a handlebar mounting portion and a gripping portion having a pair of lateral sidewalls with a receiving cavity formed between the sidewalls and an insertion opening located between the lateral sidewalls;
   an elastomeric grip cover disposed over at least the gripping portion;
   a hydraulic unit disposed within the receiving cavity and dimensioned relative to the insertion opening to be inserted into the receiving cavity via the insertion opening, and the hydraulic unit including a hydraulic cylinder housing supported by the main body and a piston movably disposed within the hydraulic cylinder housing;
   an operating lever pivotally disposed around a pivot axis relative to the main body to move the piston within the hydraulic cylinder housing in response to pivotal movement of the operating lever relative to the main body, the pivot axis extending in a lateral direction with respect to the gripping portion of the main body; and
   a fluid reservoir tank in fluid communication with the hydraulic cylinder housing by at least one reservoir port extending along the lateral direction, the fluid reservoir tank being disposed in the gripping portion of the main body.

7. The bicycle hydraulic component operating device according to claim 1, wherein
   the main body includes a pair of lateral sidewalls with a receiving cavity formed therebetween and an insertion opening formed in a top surface of the main body.

8. The bicycle hydraulic component operating device according to claim 7, wherein
   the top surface of the main body defines the insertion opening of the receiving cavity.

9. The bicycle hydraulic component operating device according to claim 7, wherein
   the hydraulic cylinder housing is dimensioned relative to the insertion opening to be inserted into the receiving cavity via the insertion opening such that the top surface of the hydraulic cylinder housing forms a seat of the gripping portion for a rider's hand.

10. The bicycle hydraulic component operating device according to claim 1, wherein
    the main body includes an insertion opening formed between the lateral sidewalls at a bottom surface of the main body, the lateral sidewalls having a receiving cavity formed therebetween, the hydraulic cylinder housing is dimensioned relative to the insertion opening to be inserted into the receiving cavity via the insertion opening from below the main body.

* * * * *